United States Patent
Perez et al.

(10) Patent No.: US 6,630,231 B2
(45) Date of Patent: *Oct. 7, 2003

(54) COMPOSITE ARTICLES REINFORCED WITH HIGHLY ORIENTED MICROFIBERS

(75) Inventors: Mario A. Perez, Bursville, MN (US); Michael D. Swan, St. Germain en Laye (FR); Terry R. Hobbs, St. Paul, MN (US); Allen R. Siedle, Lake Elmo, MN (US)

(73) Assignee: 3M Innovative Properties Company, St. Paul, MN (US)

(*) Notice: Subject to any disclaimer, the term of this patent is extended or adjusted under 35 U.S.C. 154(b) by 104 days.

This patent is subject to a terminal disclaimer.

(21) Appl. No.: 09/809,446

(22) Filed: Mar. 15, 2001

(65) Prior Publication Data

US 2001/0031594 A1 Oct. 18, 2001

Related U.S. Application Data

(60) Continuation-in-part of application No. 09/595,982, filed on Jun. 16, 2000, now Pat. No. 6,432,347, which is a division of application No. 09/245,952, filed on Feb. 5, 1999, now Pat. No. 6,110,588.

(51) Int. Cl.[7] .................. B32B 27/04; B32B 27/12; B32B 5/02
(52) U.S. Cl. ............. 428/297.4; 428/141; 428/359; 428/364; 428/370; 428/373; 428/397; 428/399
(58) Field of Search ................. 428/359, 364, 428/370, 397, 399, 373, 141, 297.4; 57/140

(56) References Cited

U.S. PATENT DOCUMENTS

| | | |
|---|---|---|
| 3,416,714 A | 12/1968 | Skinner |
| 3,470,594 A | 10/1969 | Kim |
| 3,470,685 A | 10/1969 | Hall et al. |

(List continued on next page.)

FOREIGN PATENT DOCUMENTS

| | | |
|---|---|---|
| EP | 0 026 581 | 5/1983 |
| EP | 0 353 907 | 2/1990 |
| EP | 0 806 512 A1 | 11/1997 |

(List continued on next page.)

OTHER PUBLICATIONS

Bigg, "Mechanical Property Enhancement of Semicrystalline Polymers", *Polymer Engineering and Science*, vol. 28, No. 13, pp. 830–841, Jul. 1988.

Davies, "The Separation of Airborne Dust and Particles", *Institution of Mechanical Engineers*, London, Proceedings 1B, 1952.

Doyle, "Strong Fabrics for Fast Sails", *Scientific American*, pp. 60–67, Jul. 1997.

(List continued on next page.)

*Primary Examiner*—Marie Yamnitzky
*Assistant Examiner*—C Thompson
(74) *Attorney, Agent, or Firm*—Kent S. Kokko

(57) ABSTRACT

A composite formed of a polymer matrix phase having a reinforcement phase including polymeric microfibers. The microfibers are preferably formed of a highly oriented polymer, having a high modulus value and a large surface area. The large surface area can serve to tightly bind the microfibers to the polymer matrix phase. The microfibers can be provided as a fully- or partially-microfibrillated film, as a non-woven web of entangled microfibers, or as a pulp having free fibers. The microfibers can be embedded in, or impregnated with, a polymer or polymer precursor. Some composite articles are formed from thermoset resins cured about a highly oriented polypropylene microfiber reinforcement phase, providing a strong, tough, moisture resistant article. One composite includes a matrix and reinforcement formed of the same material type and having substantially equal refractive indices, allowing the composite to be optically clear.

47 Claims, 2 Drawing Sheets

100μm

U.S. PATENT DOCUMENTS

| Number | | Date | Inventor |
|---|---|---|---|
| 3,490,663 | A | 1/1970 | Skinner |
| 3,500,626 | A | 3/1970 | Sandford |
| 3,695,025 | A * | 10/1972 | Gibbon .................. 57/140 |
| 3,719,540 | A | 3/1973 | Hall |
| 4,064,214 | A | 12/1977 | FitzGerald |
| 4,100,324 | A * | 7/1978 | Anderson et al. ........... 428/288 |
| 4,134,951 | A * | 1/1979 | Dow et al. ................. 264/147 |
| RE30,782 | E | 10/1981 | van Turnhout |
| 4,330,499 | A | 5/1982 | von und zu Aufsess et al. |
| 4,348,350 | A | 9/1982 | Meier et al. |
| RE31,285 | E | 6/1983 | van Turnhout et al. |
| 4,456,648 | A | 6/1984 | Adamse et al. |
| 4,524,101 | A | 6/1985 | Eickman et al. |
| 4,587,291 | A | 5/1986 | Gardziella et al. |
| 4,588,537 | A | 5/1986 | Klaase et al. |
| RE32,171 | E | 6/1986 | van Turnhout |
| 4,595,738 | A | 6/1986 | Hufnagel et al. |
| 4,608,089 | A | 8/1986 | Gale et al. |
| 4,626,263 | A | 12/1986 | Inoue et al. |
| 4,652,282 | A | 3/1987 | Ohmori et al. |
| 4,675,582 | A | 6/1987 | Hommes et al. |
| 4,714,716 | A | 12/1987 | Park |
| 4,789,504 | A | 12/1988 | Ohmori et al. |
| 4,825,111 | A | 4/1989 | Hommes et al. |
| 4,853,602 | A | 8/1989 | Hommes et al. |
| 4,867,937 | A | 9/1989 | Li et al. |
| 4,916,198 | A | 4/1990 | Scheve et al. |
| 4,940,736 | A | 7/1990 | Alteepping et al. |
| 4,973,517 | A * | 11/1990 | Lammers .................. 428/354 |
| 4,990,401 | A | 2/1991 | Renalls |
| 5,015,676 | A | 5/1991 | Macholdt et al. |
| 5,015,767 | A | 5/1991 | Maignan et al. |
| 5,021,473 | A | 6/1991 | Macholdt et al. |
| 5,036,262 | A | 7/1991 | Schonbach |
| 5,043,197 | A | 8/1991 | Renalls |
| 5,049,347 | A | 9/1991 | Magill et al. |
| 5,051,225 | A | 9/1991 | Hommes et al. |
| 5,057,710 | A | 10/1991 | Nishiura et al. |
| 5,069,994 | A | 12/1991 | Gitzel et al. |
| 5,072,493 | A | 12/1991 | Hommes et al. |
| 5,085,920 | A * | 2/1992 | Nohr et al. .................. 428/198 |
| 5,112,677 | A | 5/1992 | Tani et al. |
| 5,147,748 | A | 9/1992 | Gitzel et al. |
| 5,171,815 | A | 12/1992 | Magill et al. |
| 5,176,833 | A | 1/1993 | Vaughn et al. |
| 5,258,220 | A | 11/1993 | Joseph |
| 5,269,995 | A | 12/1993 | Ramanathan et al. |
| 5,354,603 | A * | 10/1994 | Errede et al. .............. 428/240 |
| 5,366,804 | A * | 11/1994 | Dugan ........................ 428/373 |
| 5,378,537 | A | 1/1995 | Masuda et al. |
| 5,387,388 | A | 2/1995 | Van Erden et al. |
| 5,395,644 | A | 3/1995 | Affinito |
| 5,434,002 | A | 7/1995 | Yoon et al. |
| 5,472,481 | A | 12/1995 | Jones et al. |
| 5,496,507 | A | 3/1996 | Angadjivand et al. |
| 5,525,287 | A | 6/1996 | Van Erden et al. |
| 5,554,722 | A | 9/1996 | Eichenauer et al. |
| 5,558,809 | A | 9/1996 | Groh et al. |
| 5,589,264 | A | 12/1996 | Yoon et al. |
| 5,605,936 | A | 2/1997 | DeNicola, Jr. et al. |
| 5,695,709 | A | 12/1997 | Van Erden et al. |
| 5,698,489 | A | 12/1997 | Shirai et al. |
| 5,783,503 | A | 7/1998 | Gillespie et al. |
| 5,807,516 | A | 9/1998 | Wolstenholme et al. |
| 5,845,355 | A | 12/1998 | Strahm |
| 5,871,845 | A | 2/1999 | Dahringer et al. |
| 5,897,779 | A * | 4/1999 | Wisted et al. .............. 210/651 |
| 5,908,598 | A | 6/1999 | Rousseau et al. |
| 5,919,847 | A | 7/1999 | Rousseau et al. |
| 5,945,215 | A | 8/1999 | Bersted et al. |
| 5,945,221 | A | 8/1999 | Tsai et al. |
| 5,968,635 | A | 10/1999 | Rousseau et al. |
| 5,976,208 | A | 11/1999 | Rousseau et al. |
| 5,998,308 | A | 12/1999 | Cohen |
| 6,002,017 | A | 12/1999 | Rousseau et al. |
| 6,013,587 | A | 1/2000 | Truong et al. |
| 6,101,032 | A | 8/2000 | Wortman et al. |
| 6,110,251 | A | 8/2000 | Jackson et al. |
| 6,110,588 | A | 8/2000 | Perez et al. |
| 6,123,752 | A | 9/2000 | Wu et al. |
| 6,124,971 | A | 9/2000 | Ouderkirk et al. |
| 6,331,343 | B1 * | 12/2001 | Perez et al. .................. 428/141 |
| 6,420,024 | B1 * | 7/2002 | Perez et al. .................. 428/359 |

FOREIGN PATENT DOCUMENTS

| | | |
|---|---|---|
| GB | 1073741 | 6/1967 |
| GB | 1157695 | 7/1969 |
| GB | 1171543 | 11/1969 |
| GB | 1234782 | 6/1971 |
| GB | 1267298 | 3/1972 |
| GB | 1541681 | 3/1979 |
| GB | 2 034 243 A | 6/1980 |
| GB | 1605004 | 12/1981 |
| JP | 4-194068 | 7/1992 |
| JP | 02 672188 | 11/1997 |
| WO | WO 95/05501 | 2/1995 |
| WO | WO 97/49326 | 12/1997 |
| WO | WO 99/20664 | 10/1998 |
| WO | WO 99/06622 | 2/1999 |
| WO | WO 99/36466 | 7/1999 |
| WO | WO 99/61520 | 12/1999 |
| WO | WO 00/00520 | 1/2000 |
| WO | WO 00/68301 | 11/2000 |

OTHER PUBLICATIONS

Jones et al., "Crystalline Forms of Isotactic Polypropylene", *Makromol. Chem.*, vol. 75, 134–158, 1964.

J. Karger–Kocsis, Polypropylene: Structure, Blends and Composites, vol. 1, 130–131, 1994.

Kolpak et al., "Deformation of Cotton and Bacterial Cellulose Microfibrils", *Textile Research Journal*, pp. 568–572, Jul. 1975.

Piccarolo et al., "Crystallization of Polymer Melts Under Fast Cooling", *Journal of Applied Polymer Science*, vol. 46, 625–634, 1992.

Roger S. Porter et al., *Journal of Macromolecular Science–Rev. Macromol. Chem. Phys.*, C35(a), 63–115, 1995.

J. I. Raukola, "A New Technology to Manufacture Polypropylene Foam Sheet and Biaxially Oriented Foam Film", VTT Publications 361, Technical Research Center of Finland (1998).

"Survey of Polymer Morphology", pp. 149–177 (no date).

Zigmond W. Wilchinsky, "Measurement of Orientation in Polypropylene Film", Journal of 'Applied Physics, vol. 31, No. 11, pp. 1969–1972, Nov. 1960.

Encyclopedia of Chemical Technology, "Thin Films (Film Formation Techniques)" vol. 23, ($4^{th}$ ed.), 1997 pp. 1040–1076.

J. D. Affinito et al., "Polymer/Polymer, Polymer/Oxide, and Polymer/Metal Vacuum Deposited Interference Filters", Proc. of the 10 International Conf. on Vacuum Coating pp. 207–220, 1996.

U.S. patent application Ser. No. 09/602,978, filed Jun. 23, 2000, "Fibrillated Article and Method of Making", pp. 1–29 (4 sheets of drawings).

U.S. patent application Ser. No. 09/858,253, filed May 15, 2001, "Fibrous Films and Articles From Microlayer Substrates", pp. 1–31.

* cited by examiner

COMPOSITE ARTICLES REINFORCED WITH HIGHLY ORIENTED MICROFIBERS

RELATED APPLICATIONS

This is a continuation-in-part of U.S. application Ser. No. 09/595,982, filed Jun. 16, 2000, now U.S. Pat. No. 6,432,347, which is a divisional of U.S. application Ser. No. 09/245,952, filed Feb. 5, 1999, now issued U.S. Pat. No. 6,110,588.

FIELD OF THE INVENTION

The present invention is related generally to composite materials. More specifically, the present invention is related to composites comprised of polymer coated highly oriented microfibers and to composites having a polymeric bulk or matrix phase reinforced with highly oriented microfibers.

BACKGROUND OF THE INVENTION

Composite materials are well known, and commonly consist of a continuous, bulk or matrix phase, and a discontinuous, dispersed, fiber, or reinforcement phase. Some composites have a relatively brittle matrix and a relatively ductile or pliable reinforcement. The relatively pliable reinforcement, which can be in the form of fibers, can serve to impart toughness to the composite. Specifically, the reinforcement may inhibit crack propagation as cracks through the brittle matrix are deflected and directed along the length of the fibers. Other composites have a relatively soft matrix and a relatively rigid or strong reinforcement phase, which can include fibers. Such fibers can impart strength to the matrix, by transferring applied loads from the weak matrix to the stronger fibers.

Fibers that impart additional strength may be formed of polymers, metals, or other materials. Many materials, such as metals, have the disadvantage relatively high weight and density. Other materials, such as glass, may be inexpensive and lighter, but may wick moisture into the composite, which may make the composite unsuitable for some applications, such as marine applications. In particular, long-term submersion in water may lead to significant water uptake and decomposition, including delamination in some applications. The wicking may be caused by less than optimal adhesion between the fibers and the matrix phase, allowing moisture to be wicked in through the elongated voids formed between the fibers and the matrix. Use of inexpensive polymers, such as olefins, would be advantageous with respect to cost and weight, but known olefin fibers that are strong enough to impart the required strength to the composite may not be capable of receiving stress from the matrix, because of the low surface energy nature of known olefin fiber surfaces. Inexpensive polymer fibers such as olefin fibers may also allow wicking of moisture even though they are hydrophobic in nature.

Highly oriented ultrahigh molecular weight polyethylene fibers such as SPECTRA® (available from Allied Signal Corporation, Morristown N.J.) are available. These fibers have relatively large diameters and smooth surfaces, and are relatively expensive and are prepared by a gel spinning process followed by hot drawing. A need, therefore, exists for oriented fibers as a composite reinforcement phase having a larger surface area, providing a more optimal surface for binding to a matrix phase or to a cured polymer. What would also be advantageous are composite materials impervious to moisture, and composites utilizing reinforcements derived from common polymers, but having the strength of more expensive materials.

Composites are often opaque, either inherently due to the matrix phase properties or through the addition of pigments, or other components. Some polymers, when cast in sufficiently thin layers and not having pigment added, may be transparent or translucent. When fiber reinforcements are added to a transparent matrix phase the resulting composite is typically opaque or cloudy. What would be desirable, therefore, are fiber reinforced polymeric composites and composite articles that are transparent or translucent to visible light.

SUMMARY OF THE INVENTION

The present invention includes composite articles having a polymeric bulk or matrix phase and a polymeric reinforcement phase comprising polymeric microfibers. The microfibers can be provided by forming highly oriented, semi-crystalline, polymeric films or foams, followed by partially or totally microfibrillating the highly oriented film, thereby forming the microfibers. The microfibers thus formed may be present in free form as a pulp, as a non-woven web of entangled microfibers, and as a microfibrous article including partially and totally microfibrillated films. The polymeric reinforcement phase may comprise engineering fibers in combination with the polymeric microfibers. A preferred reinforcement is formed from polypropylene microfibers.

The matrix phase may be an elastomeric polymer in one embodiment, a thermoset polymer is another embodiment, a thermoplastic polymer in another embodiment, and a thermoplastic elastomeric polymer in yet another embodiment. A preferred matrix material in one embodiment is formed of thermoplastic, elastomeric syndiotactic polypropylene. One composite article according to the present invention is a brittle, rigid polymeric matrix having a microfibrous reinforcement phase. The microfibrous reinforcement phase can increase the toughness of the composite. The matrix phase may be either continuous or discontinuous. One discontinuous matrix phase includes numerous gas bubbles or pockets disposed within the matrix.

One article according to the present invention includes an elastomeric matrix having a stronger microfibrous reinforcement material within. The reinforcement can provide added strength and stiffness to the elastomeric matrix material. One strengthened composite material includes a transparent or translucent matrix material and a microfibrous reinforcement material having the same or similar refractive index as the matrix material, wherein the microfibrous reinforcement material is comprised of fibers small enough not to scatter light when essentially fully wetted by the matrix material. The resulting article may be strengthened by the microfibrous reinforcement material while appearing optically clear, or at least translucent. One composite article includes an elastomeric semi-syndiotactic polypropylene matrix phase, and a microfibrous reinforcement phase. Strengthened elastomeric composites may be used to form seals and gaskets.

DETAILED DESCRIPTION OF THE INVENTION

Figure 1:
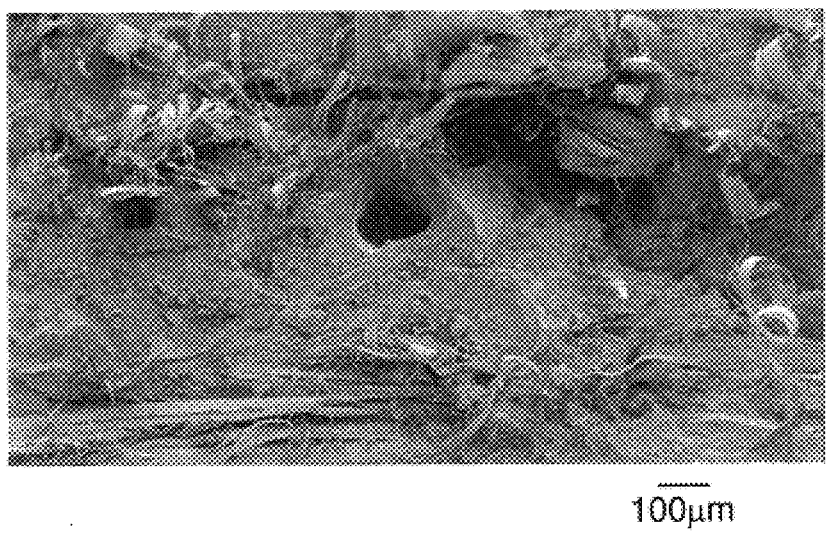
FIG. 1 is a digital image of a SEM of the 4-ply microfiber reinforced thermoset epoxy composite of Example 4.
Figure 2:
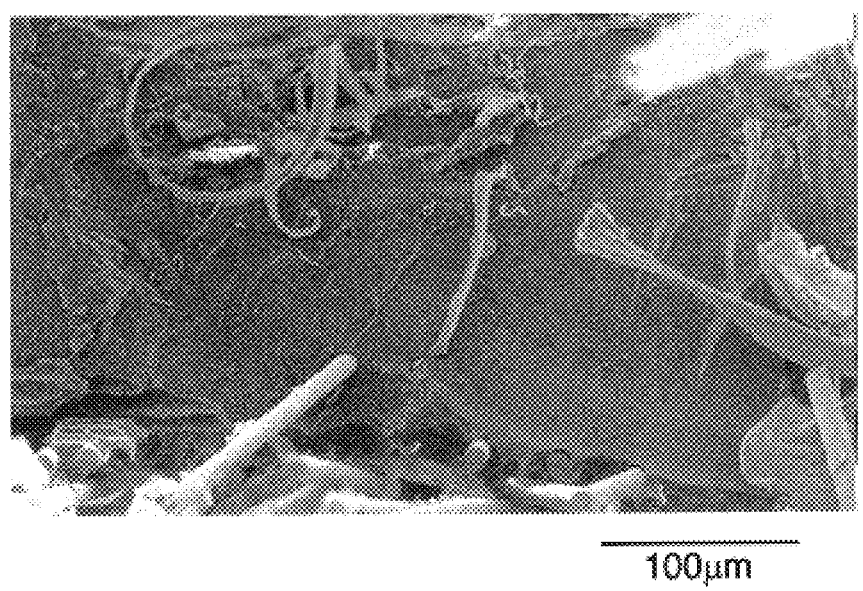
FIG. 2 is a digital image of an SEM of the 5-ply microfiber and E-glass reinforced thermoset epoxy hybrid composite of Example 12.

The present invention utilizes microfibers, which may be provided using methods described in commonly assigned U.S. Pat. No. 6,110,588, U.S. Ser. No. 09/307,577 filed May 7, 1999, now U.S. Pat. No. 6,331,343, and U.S. Ser. No. 09/602,978 filed Jun. 23, 2000, now U.S. Pat. No. 6,468,451, herein incorporated by reference. The microfibers may be provided as a collection of free fibers or pulp, as a mat of microfibers entangled together, as a microfibrous article comprising a fully or partially microfibrillated film having microfibers protruding therefrom, or as strips cut from the aforementioned microfibrous article.

Polymers useful in forming the microfibers include any melt-processible crystalline, semicrystalline or crystallizable polymers. Semicrystalline polymers consist of a mixture of amorphous regions and crystalline regions. The crystalline regions are more ordered and segments of the chains actually pack in crystalline lattices. Some polymers can be made semicrystalline by heat treatments, stretching or orienting, and by solvent inducement, and these processes can control the degree of true crystallinity. Semicrystalline polymers useful in the present invention include, but are not limited to, high and low density polyethylene, polypropylene, polyoxymethylene, poly(vinylidine fluoride), poly(methylpentene), poly(ethylene-chlorotrifluoroethylene), poly(vinyl fluoride), poly(ethylene oxide), poly(ethylene terephthalate), poly(butylene terephthalate), nylon 6, nylon 6,6, nylon 6,12, polybutene, and thermotropic liquid crystal polymers. Examples of suitable thermotropic liquid crystal polymers include aromatic polyesters that exhibit liquid crystal properties when melted and which are synthesized from aromatic diols, aromatic carboxylic acids, hydroxycarboxylic acids, and other like monomers. Typical examples include a first type consisting of parahydroxbenzoic acid (PHB), terephthalic acid, and biphenol; and second type consisting of PHB and 2,6-hydroxynaphthoic acid; and a third type consisting of PHB, terephthalic acid, and ethylene glycol.

Useful polymers preferably are those that can undergo processing to impart a high orientation ratio in a manner that enhances their mechanical integrity, and are semi-crystalline in nature. Orienting semi-crystalline polymers significantly improves the strength and elastic modulus in the orientation direction, and orientation of a semicrystalline polymer below its melting point results in an oriented crystalline phase with fewer chain folds and defects. The most effective temperature range for orienting semicrystalline polymers is between the alpha crystallization temperature of the polymer and its melting point. The alpha crystallization temperature, or alpha transition temperature, corresponds to a secondary transition of the polymer at which crystal sub-units can be moved within the larger crystal unit.

Preferred polymers in this aspect therefore are those that exhibit an alpha transition temperature ($T_{\alpha c}$) and include, for example: high density polyethylene, linear low density polyethylene, ethylene alpha-olefin copolymers, polypropylene, poly(vinylidene fluoride), poly(vinyl fluoride), poly(ethylene chlorotrifluoroethylene), polyoxymethylene, poly(ethylene oxide), ethylene-vinyl alcohol copolymer, and blends thereof. Blends of one or more compatible polymers may also be used in practice of the invention. In the case of blends, it is not necessary that both components exhibit an alpha crystallization temperature. Particularly preferred polymers in this aspect have melting temperatures greater than 140° C. and blends of such polymers with lower temperature melting polymers. Polypropylene is one such polymer. Particularly preferred polymers are polyolefins such as polypropylene and polyethylene that are readily available at low cost and can provide highly desirable properties in the microfibrous articles used in the present invention, such properties including high modulus and high tensile strength.

Microfibers may be formed using various methods. In one method, a polymeric film is extruded from the melt through a die in the form of a film or sheet. The extruded film may be quenched to maximize the crystallinity of the film by retarding or minimizing the rate of cooling. The quenching preferably occurs to not only maximize the crystallinity, but to maximize the size of the crystalline spherulites.

In a preferred method, the film is calendered after quenching. Calendering allows higher molecular orientation to be achieved by enabling subsequent higher draw ratios. After calendering, the film can be oriented uniaxially in the machine direction by stretching the film to impart a microvoided surface thereto under conditions of plastic flow that are insufficient to cause catastrophic failure of the film. In one example, using polypropylene, the film may be stretched at least 5 times its length. In a preferred embodiment, when considering both calendering and stretching, the combined draw ratio is at least about 10:1. In one embodiment, the preferred draw ratio is between about 10:1 and 40:1 for polypropylene.

There are several widely accepted means by which to measure molecular orientation in oriented polymer systems, among them scattering of light or X-rays, absorbance measurements, mechanical property analysis, and the like. Quantitative methods include wide angle X-ray scattering ("WAXS"), optical birefringence, infrared dichroism, and small angle X-ray scattering ("SAXS"). A preferred method to determine the fibril orientation distribution is the WAXS technique, in which crystalline planes within the fibrillar structures scatter or diffract incident X-ray beams at an established angle, known as the Bragg angle (see A. W. Wilchinsky, Journal of Applied Physics, 3101), 1969 (1960) and W. B. Lee et al., Journal of Materials Engineering and Performance, 5(5), 637 (1996)). In WAXS, a crystalline plane such as the (110) plane of isotactic monoclinic polypropylene containing information about the polypropylene molecular chain axis is measured and then related by sample geometry to external co-ordinates.

The stretching conditions are preferably chosen such that microvoids are imparted in the film surface. The film or material to be microvoided is preferably stretched at a rate sufficiently fast or at a temperature sufficiently low, such that the polymer, of which the film or material is comprised, is unable to conform to the imposed deformation while avoiding catastrophic failure of the film or material. The highly oriented, highly crystalline film with microvoids may then be subject to sufficient fluid energy to the surface to release the microfibers from the microvoided film or material.

In one microfibrillation method, a high-pressure fluid is used to liberate the microfibers from the film. A water jet is a preferred device for liberating microfibers in some embodiments. In this process one or more jets of a fine fluid stream impact the surface of the polymer film, which may be supported by a screen or moving belt, thereby releasing the microfibers from the polymer matrix. One or both surfaces of the film may be microfibrillated. The degree of microfibrillation is dependent on the exposure time of the film to the fluid jet, the pressure of the fluid jet, the cross-sectional area of the fluid jet, the fluid contact angle, the polymer properties and, to a lesser extent, the fluid temperature. Different types and sizes of screens can be used to support the film.

Any type of liquid or gaseous fluid may be used. Liquid fluids may include water or organic solvents such as ethanol or methanol. Suitable gases such as nitrogen, air or carbon dioxide may be used, as well as mixtures of liquids and gases. Any such fluid is preferably non-swelling (i.e., is not absorbed by the polymer matrix), which would reduce the orientation and degree of crystallinity of the microfibers. Preferably the fluid is water. The fluid temperature may be elevated, although suitable results may be obtained using ambient temperature fluids. The pressure of the fluid should be sufficient to impart some degree of microfibrillation to at least a portion of the film, and suitable conditions can vary widely depending on the fluid, the nature of the polymer, including the composition and morphology, configuration of the fluid jet, angle of impact and temperature. Typically, the fluid is water at room temperature and at pressures of at least 3400 kPa (500 psi), although lower pressure and longer exposure times may be used. Such fluid will generally impart a minimum of 10 W/cm$^2$ based on calculations assuming incompressibility of the fluid, a smooth surface and no losses due to friction.

In a second microfibrillation method, the film or material to be microfibrillated is immersed in a high-energy cavitating medium. One method of achieving this cavitation is by applying ultrasonic waves to the fluid. The rate of microfibrillation is dependent on the cavitation intensity. Ultrasonic systems can range from low acoustic amplitude, low energy ultrasonic cleaner baths, to focused low amplitude systems up to high amplitude, high intensity acoustic probe systems.

One method that comprises the application of ultrasonic energy involves using a probe system in a liquid medium in which the fibrous film is immersed. The horn (probe) should be at least partially immersed in the liquid. For a probe system, the fibrous film is exposed to ultrasonic vibration by positioning it between the oscillating horn and a perforated metal or screen mesh (other methods of positioning are also possible), in the medium. Advantageously, both major surfaces of the film are microfibrillated when using ultrasound. The depth of microfibrillation in the fibrous material is dependent on the intensity of cavitation, amount of time that it spends in the cavitating medium and the properties of the fibrous material. The intensity of cavitation is a factor of many variables such as the applied amplitude and frequency of vibration, the liquid properties, fluid temperature and applied pressure and location in the cavitating medium. The intensity (power per unit area) is typically highest beneath the horn, but this may be affected by focusing of the sonic waves.

The method comprises positioning the film between the ultrasonic horn and a film support in a cavitation medium (typically water) held in a tank. The support serves to restrain the film from moving away from the horn due to the extreme cavitation that takes place in this region. The film can be supported by various means, such as a screen mesh, a rotating device that may be perforated or by adjustment of tensioning rollers that feed the film to the ultrasonic bath. Film tension against the horn can be alternatively used, but correct positioning provides better microfibrillation efficiency. The distance between the opposing faces of the film and the horn and the screen is generally less than about 5 mm (0.2 inches). The distance from the film to the bottom of the tank can be adjusted to create a standing wave that can maximize cavitation power on the film, or alternatively other focusing techniques can be used. Other horn to film distances can also be used. The best results typically occur when the film is positioned near the horn or at ¼ wavelength distances from the horn, however this is dependent on factors such as the shape of the fluid container and radiating surface used. Generally positioning the sample near the horn, or near the first or second ¼ wavelength distance is preferred. Conditions are chosen so as to provide acoustic cavitation. In general, higher amplitudes and/or applied pressures provide more cavitation in the medium. Generally, the higher the cavitation intensity, the faster the rate of microfiber production and the finer (smaller diameter) the microfibers that are produced. While not wishing to be bound by theory, it is believed that high-pressure shock waves are produced by the collapse of the incipient cavitation bubbles, which impacts the film resulting in microfibrillation.

In a second method of forming microfibers (described in U.S. Ser. No. 09/307,577, filed May 7, 1999, now U.S. Pat. No. 6,331,343, incorporated herein by reference) an oriented polymer film comprising an immiscible mixture of a first polymer component and a void-initiating component is stretched along at least one major axis (uniaxial orientation) to impart a voided morphology thereto, optionally stretched along a second major axis (biaxial orientation), and then microfibrillated as described supra. Semicrystalline polymers useful as the first polymer component in the immiscible mixture include any melt-processable crystalline, semicrystalline or crystallizable polymers or copolymers, including block, graft and random copolymers.

Semicrystalline polymers useful in this method of forming microfibers include, but are not limited to those described above as well as linear low density polyethylene, ethylene-vinyl alcohol copolymer, and syndiotactic polystyrene. Preferred polymers are polyolefins such as polypropylene and polyethylene that are readily available at low cost and can provide highly desirable properties in the microfibrillated articles such as high modulus and high tensile strength.

The semicrystalline polymer component may further comprise small amounts of a second polymer to impart desired properties to the microfibrillated film of the invention. The second polymer of such blends may be semicrystalline or amorphous and is generally less than 30 weight percent, based of the weight of the semicrystalline polymer component. For example, small amounts of linear low density polyethylene may be added to polypropylene, when used as the semicrystalline polymer component, to improve the softness and drapability of the microfibrillated film. Small amounts of other polymers may be added, for example, to enhance stiffness, crack resistance, Elmendorff tear strength, elongation, tensile strength and impact strength, as is known in the art.

The void-initiating component is chosen so as to be immiscible in the semicrystalline polymer component. It may be an organic or an inorganic solid having an average particle size of from about 0.1 to 10.0 microns and may be any shape including amorphous shapes, spindles, plates, diamonds, cubes, and spheres. Inorganic solids useful as void-initiating components include solid or hollow glass, ceramic or metal particles, microspheres or beads; zeolite particles; inorganic compounds including, but not limited to metal oxides such as titanium dioxide, alumina and silicon dioxide; metal, alkali- or alkaline earth carbonates or sulfates; kaolin, talc, carbon black and the like. Inorganic void initiating components are chosen so as to have little surface interaction, due to either chemical nature or physical shapes, when dispersed in the semicrystalline polymer component. In general the inorganic void-initiating components should not be chemically reactive with the semicrystalline polymer component, including Lewis acid/base interactions, and have minimal van der Waals interactions.

Preferably the void-initiating component comprises a thermoplastic polymer, including semicrystalline polymers and amorphous polymers, to provide a blend immiscible with the semicrystalline polymer component. An immiscible blend shows multiple amorphous phases as determined, for example, by the presence of multiple glass transition temperatures. As used herein, "immiscibility" refers to polymer blends with limited solubility and non-zero interfacial tension, i.e. a blend whose free energy of mixing is greater than zero:

$$\Delta G_m \cong \Delta H_m > 0$$

Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, Flory-Huggins interaction parameter between two non-polar polymers is always a positive number.

Polymers useful as the void-initiating component include the above described semicrystalline polymers, as well as amorphous polymers, selected so as to form discrete phases upon cooling from the melt. Useful amorphous polymers include, but are not limited to, polystyrene and polymethymethacrylate The immiscible mixture of a first polymer component and a void-initiating component is extruded from the melt through a die in the form of a film or sheet and quenched to maximize the crystallinity of the semicrystalline phase by retarding or minimizing the rate of cooling. It is preferred that the crystallinity of the semicrystalline polymer component be increased by an optimal combination of casting and subsequent processing such as calendering, annealing, stretching and recrystallization. It is believed that maximizing the crystallinity of the film will increase microfibrillation efficiency.

Upon orientation, voids are imparted to the film. As the film is stretched, the two components separate due to the immiscibility of the two components and poor adhesion between the two phases. When the film comprise a continuous phase and a discontinuous phase, the discontinuous phase serves to initiate voids which remain as substantially discrete, discontinuous voids in the matrix of the continuous phase. When two continuous phases are present, the voids that form are substantially continuous throughout the polymer film. Typical voids have major dimensions X and Y, proportional to the degree of orientation in the machine and transverse direction respectively. A minor dimension Z, normal to the plane of the film, remains substantially the same as the cross-sectional dimension of the discrete phase (void-initiating component) prior to orientation. Voids arise due to poor stress transfer between the phases of the immiscible blend. It is believed that low molecular attractive forces between the blend components are responsible for immiscible phase behavior; low interfacial tension results in void formation when the films are stressed by orientation or stretching.

Unexpectedly, it has been found that voids may be imparted to the two component (semicrystalline and void initiating) polymer films under condition far less severe than those necessary to impart voids to single component films. It is believed that the immiscible blend, with limited solubility of the two phases and a free energy of mixing greater than zero, facilitates the formation of the voids necessary for subsequent microfibrillation.

The conditions for orientation are chosen such that the integrity of the film is maintained. Thus when stretching in the machine and/or transverse directions, the temperature is chosen such that substantial tearing or fragmentation of the continuous phase is avoided and film integrity is maintained. The film is particularly vulnerable to tearing or even catastrophic failure if the temperature is too low, or the orientation ratio(s) is/are excessively high. Preferably, the orientation temperature is above the glass transition temperature of the continuous phase. Such temperature conditions permit maximum orientation in the X and Y directions without loss of film integrity, maximize the voiding imparted to the film, and consequently maximize the ease with which the surface (s) may be microfibrillated. Films may be stretched in each direction up to 2 to 10 times their original dimension in the direction of stretching.

Voids are relatively planar in shape, irregular in size and lack distinct boundaries. Voids are generally coplanar with the film, with major axes in the machine (X) and transverse (Y) directions (directions of orientation). The size of the voids is variable and proportional to the size of the discrete phase and degree of orientation. Films having relatively large domains of discrete phase and/or relatively high degrees of orientation will produce relatively large voids. Films having a high proportion of discrete phases will generally produce films having a relatively high void content on orientation. Void size, distribution and amount in the film matrix may be determined by techniques such as small angle X-ray scattering (SAXS), confocal microscopy, scanning electron microscopy (SEM) or density measurement. Additionally, visual inspection of a film may reveal enhanced opacity or a silvery appearance due to significant void content.

Generally, greater void content enhances the subsequent microfibrillation, and subsequently, using the process of this invention, for uniaxially oriented films, the greater the yield of microfibers and for biaxially oriented films, the greater the yield of microfibrous flakes. Preferably, when preparing an article having at least one microfibrillated surface, the polymer film should have a void content in excess of 5%, more preferably in excess of 10%, as measured by density; i.e., the ratio of the density of the voided film with that of the starting film. The oriented and voided films are then subjected to sufficient fluid energy to release the microfibers therefrom as described above.

In a third method of forming microfibers (described in U.S. Ser. No. 09/602,978, filed Jun. 23, 2000, now U.S. Pat. No. 6,468,451, incorporated herein by reference), an oriented foamed polymer is formed and microfibrillated. The oriented foam is prepared by the steps of extruding a mixture comprising a high melt-strength polypropylene and a blowing agent to produce a foam, and orienting the extruded foam in at least one direction. Preferably the method comprises mixing at least one high melt strength polypropylene and at least one blowing agent in an apparatus having an exit shaping orifice at a temperature and pressure sufficient to form a melt mixture wherein the blowing agent is uniformly distributed throughout the polypropylene; reducing the temperature of the melt mixture at the exit of the apparatus to an exit temperature that no more than 30° C. above the melt temperature of the neat polypropylene while maintaining the melt mixture at a pressure sufficient to prevent foaming; passing the mixture through said exit shaping orifice and exposing the mixture to atmospheric pressure, whereby the blowing agent expands causing cell formation resulting in foam formation; orienting the foam; and microfibrillating the foam.

An extrusion process using a single-screw, twin-screw or tandem extrusion system may prepare the foams useful in the present invention. This process involves mixing one or more high melt strength propylene polymers (and any optional polymers to form a propylene polymer blend) with a blowing agent, e.g., a physical or chemical blowing agent, and heating to form a melt mixture. The temperature and pressure conditions in the extrusion system are preferably sufficient to maintain the polymeric material and blowing agent as a homogeneous solution or dispersion. Preferably, the polymeric materials are foamed at no more than 30° C. above the melting temperature of the neat polypropylene thereby producing desirable properties such as uniform and/or small cell sizes.

When a physical blowing agent such as $CO_2$ is used, the neat polymer is initially maintained above the melting temperature. The physical blowing agent is injected (or otherwise mixed) with the molten polymer and the melt mixture is cooled in the extruder to an exit temperature that is less than 30° C. above the melting temp of the neat polymer ($T \leq T_m + 30°$ C.) while the pressure is maintained at or above 2000 psi (13.8 MPa). Under these conditions the melt mixture remains a single phase. As the melt mixture passes through the exit/shaping die the melt rapidly foams and expands, generating foams with small, uniform cell sizes. It has been found that, by adding a physical blowing agent, the polypropylene may be processed and foamed at temperatures considerably lower than otherwise might be required. The lower temperature can allow the foam to cool and stabilize soon after it exits the die, thereby making it easier to arrest cell growth and coalescence while the cells are smaller and more uniform.

When a chemical blowing agent is used, the blowing agent is added to the neat polymer, mixed, heated to a temperature above the $T_m$ of the polypropylene to ensure intimate mixing and further heated to the activation temperature of the chemical blowing agent, resulting in decomposition of the blowing agent. The temperature and pressure of the system are controlled to maintain substantially a single phase. The gas formed on activation is substantially dissolved or dispersed in the melt mixture. The resulting single-phase mixture is cooled to an exit temperature no more than 30° C. above the melting temperature of the neat polymer, while the pressure is maintained at or above 2000 psi, (13.8 Mpa) by passing the mixture through a cooling zone(s) in the extruder prior to the exit/shaping die. Generally the chemical blowing agent is dry blended with the neat polymer prior to introduction to the extruder, such as in a mixing hopper.

With either a chemical or physical blowing agent, as the melt mixture exits the extruder through a shaping die, it is exposed to the much lower atmospheric pressure causing the blowing agent (or its decomposition products) to expand. This causes cell formation resulting in foaming of the melt mixture. When the exit temperature is no more than 30° C. above the $T_m$ of the neat polypropylene, the extensional viscosity of the polymer increases as the blowing agent comes out of the solution and the polypropylene rapidly crystallizes. These factors arrest the growth and coalescence of the foam cells within seconds or, most typically, a fraction of a second. Preferably, under these conditions, the formation of small and uniform cells in the polymeric material occurs. When exit temperatures are in excess of 30° C. above the $T_m$ of the neat polymer, cooling of the polymeric material may take longer, resulting in non-uniform, unarrested cell growth. In addition to the increase in $T_m$, adiabatic cooling of the foam may occur as the blowing agent expands.

Foams having cell sizes averaging less than 100 micrometers, and advantageously foams having cell sizes averaging less than 50 micrometers are produced by this method. Additionally the foams produced have a closed cell content of 70 percent or greater. As a result of extrusion, the cells will be elongated in the machine direction.

In order to optimize the physical properties of the foam and microfibers produced from the foam by subsequent microfibrillation, the polymer chains need to be oriented along at least one major axis (uniaxial), and may further be oriented along two major axes (biaxial). The degree of molecular orientation is generally defined by the draw ratio, that is, the ratio of the final length to the original length.

Upon orientation, greater crystallinity is imparted to the polypropylene component of the foam and the dimensions of the foam cells change. Typical cells have major directions X and Y, proportional to the degree of orientation in the machine and transverse direction respectively. A minor direction Z, normal to the plane of the foam, remains substantially the same as (or may be moderately less than) the cross-sectional dimension of the cell prior to orientation.

The conditions for orientation are chosen such that the integrity of the foam is maintained. Thus, when stretching in the machine and/or transverse directions, the orientation temperature is chosen such that substantial tearing or fragmentation of the continuous phase is avoided and foam integrity is maintained. The foam is particularly vulnerable to tearing, cell rupture or even catastrophic failure if the orientation temperature is too low or the orientation ratio(s) is/are excessively high. Generally the foam is oriented at a temperature between the glass transition temperature and the melting temperature of the neat polypropylene. Preferably, the orientation temperature is above the alpha transition temperature of the neat polymer. Such temperature conditions permit optimum orientation in the X and Y directions without loss of foam integrity, consequently maximizing the ease with which the surface(s) may be microfibrillated.

Unexpectedly, it has been found that orienting reduces the foam density, thus enabling the production of lower density foams than are achievable using blowing agents alone. Up to a 60% reduction in density has been observed. Further, microfibrillation of oriented foams requires less fluid pressure (i.e. less energy) than does microfibrillation of unfoamed films that have a higher degree of orientation. As a result, microfibers can be produced with lower operating and equipment costs, and greater ease of manufacturing.

After orientation the cells are relatively planar in shape and have distinct boundaries. Cells are generally coplanar with the major surfaces of the foam, with major axes in the machine (X) and transverse (Y) directions (directions of orientation). The sizes of the cells are substantially uniform and dependent on concentration of blowing agent, extrusion conditions and degree of orientation. The percentage of closed cells does not change significantly after orientation when using high melt strength polypropylene. In contrast, orientation of conventional polypropylene foam results in cell collapse and tearing of the foam, reducing the percentage of closed cells. Cell size, distribution and amount in the foam matrix may be determined by techniques such as scanning electron microscopy.

In the orienting step, the foam is stretched in the machine direction and may be simultaneously or sequentially stretched in the transverse direction. When first stretched in the machine direction, the individual fibrils of the spherulites of the polypropylene are drawn substantially parallel to the machine direction (direction of orientation) of the film and in the plane of the film. The oriented fibrils can be visualized as having a rope-like appearance. Subsequent or further orientation of the film in the transverse direction results in reorientation of the fibrils, again in the plane of the film, with varying populations along the X, Y and intermediate axes, depending on the degree of orientation in the machine and transverse directions.

The stretching conditions are chosen to increase the crystallinity of the polymer matrix and the void volume of the foam. It has been found that an oriented foam is readily fibrillated, even with a relatively low void content when compared to oriented, unfoamed films, and is readily fibrillated at a lower total draw ratio compared to unfoamed film. In other words, the foams need not be as highly oriented as films to achieve subsequent fibrillation. As used herein "total draw ratio" is the product of the draw ratios in the machine and transverse directions, i.e=MD×TD.

Additionally, the high melt strength polypropylene allows the preparation of foams with smaller cell sizes, and a larger density decrease on orientation (to produce a lower density foam) than conventional polypropylene. Lower density foams may be more easily fibrillated than higher density foams. The high melt strength polypropylene also allows higher draw ratios to produce fibrillated articles and fibers having higher tensile strength than can be achieved with conventional polypropylene.

The foam may be biaxially oriented by stretching in mutually perpendicular directions at a temperature above the alpha transition temperature and below the melting temperature of the polypropylene. Generally, the foam is stretched in one direction first and then in a second direction perpendicular to the first. However, stretching may be effected in both directions simultaneously if desired. If biaxial orientation is desired, it is preferable to simultaneously orient the foam, rather than sequentially orient the foam along the two major axes. It has been found that simultaneous biaxial orientation provides improved physical properties such as tensile strength as compared to sequential biaxial orientation.

In a typical sequential orientation process, the foam is stretched first in the direction of extrusion over a set of rotating rollers then stretched in the transverse direction by means of a tenter apparatus. Alternatively, foams may be stretched in both the machine and transverse directions in a tenter apparatus. Foams may be stretched in one or both directions 3 to 50 times total draw ratio (MD×TD). Greater orientation is achievable using foams of small cell size; foams having cell size of greater than 100 micrometers are not readily oriented more than 20 times, while foams having a cell size of 50 micrometers or less may be stretched up to 50 times total draw ratio. The uniaxially oriented and voided films are then subjected to sufficient fluid energy to release the microfibers therefrom as described above. The microfibers thus released may be several orders of magnitude smaller in diameter than fibers obtained using other, mechanical methods In one method, only one side of the film (or foam) is microfibrillated. In another method, both sides of the film (or foam) are microfibrillated. In some methods, the film (or foam) is only partially microfibrillated, leaving a substantially contiguous film (or foam) having microfibers protruding therefrom. Partial microfibrillation may be defined as microfibrillating a film to a depth less than the thickness of the film. One or both sides of the microfibrillated article may bear a microfibrous surface comprising microfibers. In another method, the film is fully microfibrillated, forming an entangled mass of microfibers. Total microfibrillation or fully microfibrillating may be defined as microfibrillating through the thickness of the film. If desired, pre-selected areas of a film may be microfibrillated by means of masks or selective applications of high-pressure fluids imparted to the film surface.

The microfibers generally have an effective average diameter less than about 20 microns, and can have an effective average diameter ranging from about 0.01 microns to about 10 microns, preferably 0.1 to 5 microns, and are substantially rectangular in cross section. As the microfibers are usually substantially rectangular, the effective diameter may be a measure of the average value of the width and thickness of the fibers. Some microfibers have a Transverse Aspect Ratio of from 1.5:1 to 20:1, while other microfibers have a transverse aspect ratio of between about 3:1 to 9:1. The Transverse Aspect Ratio may be defined as the ratio of width to thickness. In some embodiments, the microfibers can have an average cross sectional area of between about 0.5 and 3.0 square microns. In some embodiments, the microfibers can have an average cross sectional area of between about 0.7 and 2.1 square microns. Atomic force microscopy reveals that the microfibers of the present invention are bundles of individual or unitary fibrils, which in aggregate form the rectangular or ribbon-shaped microfibers. Thus, the surface area exceeds that which may be expected from rectangular shaped microfibers, and such surface enhances bonding in thermoset and thermoplastic matrices.

The microfibers can have a surface area greater than about 0.25 square meters per gram, typically about 0.5 to about 30 square meters per gram, preferably at least 3 square meters per gram. One embodiment includes microfibers having a surface area of at least about 5 square meters per gram. The microfibers may also have a very high modulus. In one example, polypropylene fibers used in the present invention can have a modulus greater than $10^9$ Pascal.

In yet another method, the fully or partially microfibrillated article is cut into strips having a microfibrous surface, i.e. having microfibers or microfibrous flakes protruding therefrom and embedded into the polymer matrix. One embodiment forms microfibrous strips having a preselected width, for example, of about 100 microns or less. Generally, the strips of microfibrillated article microfibrillated article strips have an average width of between about 1.5 and $4 \times 10^8$ times the average cross sectional area of the microfibers.

In still another embodiment, the one or two sided, partially or totally microfibrillated article is processed into a pulp and embedded into the polymer matrix. One suitable processing method includes feeding the microfibrillated article through a carding machine. One other method includes collecting loose microfibers harvested from a microfibrillated article, for example, by scraping the microfibers from the film surface using a knife-edge. One method further processes the microfibers, which can be produced using the methods described above.

The microfibers can be formed into a non-woven mat by forming the microfibers on a scrim or screen to provide a porous surface on which to form the non-woven mat and embedded into the polymer matrix. Microfibers can also be formed into mats or preforms by stacking or layering microfibrous mats, preferably with the major fiber axis orientation in each mat being biased relative to that of an adjacent mat. The construction of the laminate and the orientation or bias of each fiber layer may be determine by performance requirements, as is known to one skilled in the art. Entangling fibers between layers can be of further use by forming a mechanical bond between layers and thereby reducing or eliminating delamination between layers in the ultimate composite. Further, altering the major fiber axis, or biasing, the adjacent layers provides additional tensile strength along the different axes.

Hybrid mats or hybrid preforms containing more than one microfiber type or containing both microfibers and engineering fibers can be made and used advantageously in the present invention. Engineering fibers are characterized by their high tensile modulus and/or tensile strength. Engineering fibers include but are not limited to E-glass, S-glass, boron, ceramic, carbon, graphite, aramid, poly (benzoxazole), ultra high molecular weight polyethylene (UHMWPE), and liquid crystalline thermotropic fibers. In one embodiment of hybrid mats or hybrid preforms each layer or ply consists of a single fiber type. In another embodiment of hybrid mats or hybrid preforms, each ply consists of two or more fiber types. Entangling fibers between layers in hybrid mats or preforms can also provide the advantages described above.

The use of hybrid mats or hybrid preforms in composites can impart properties that cannot be realized with a single fiber type. For example, the high stiffness imparted by an engineering fiber can be combined with the low density and toughness imparted by the microfibers. The extremely large amount of interfacial area of the microfibers can be effectively utilized as a means to absorb and dissipate energy, such as that arising from impact. In one embodiment a microfiber mat comprised of hydrophobic microfibers is placed at each of the outermost major surfaces of the hybrid mat, thereby forming a moisture barrier for the inner layers. This is especially advantageous when the inner layers are comprised of relatively hydrophilic fibers such as glass.

One embodiment of the invention provides a reinforced elastomeric article comprised of an elastomeric matrix and the microfibrous reinforcement material or article. In this embodiment an elastomeric article is strengthened with a microfibrous article. The microfibers, which can have a high modulus, can impart strength to the otherwise weak elastomeric matrix. One elastomer, a thermoplastic elastomeric polypropylene, suitable for use with the present invention is semi-syndiotactic polypropylene (SP), as described in U.S. Ser. No. 08/956,880 (Siedle et al.) filed Oct. 23, 1997, now U.S. Pat. No. 6,265,512, herein incorporated by reference in its entirety. One composite article made according to the present invention includes a semi-syndiotactic polypropylene matrix having polypropylene microfibers as a reinforcing material. Other elastomeric polypropylenes, such as are known in the art, may also be used as the matrix phase.

In one embodiment, the polymeric matrix phase is selected to be either transparent or translucent, and the reinforcement phase is selected to have a refractive index substantially equal to the refractive index of the matrix phase. The substantially equal refractive indices can provide a finished article that is either transparent or translucent to visible light. By substantially equal it is meant that the respective refractive indices are within 10% of each other, preferably within 5%, most preferably 2%.

In one composite article according to the present invention, the microfibers and matrix have a sufficiently equal refractive index so as to render the composite article substantially transparent to visible light, such that 12-point type can be read through the article. In another composite article, the microfibers and matrix have a sufficiently equal refractive index so as to render the composite article substantially transparent to visible light, such that at least about 50 percent of 400 to 700 nanometer wavelength light passes through a 1 millimeter thick sheet composite article. In one embodiment, a composite article comprising atactic polypropylene microfibers having a refractive index of about 1.49, and a elastomeric polypropylene matrix having a refractive index of about 1.49 is provided.

Reinforced elastomeric materials made according to the present invention may be used to form adhesives, sealants, and gaskets. Reinforced elastomers may be used in pharmaceutical container sealing, clear laminating films, clear laminating adhesives, adhesives for oily surfaces, and water sealing applications. In particular, clear reinforced elastomers may be used as to form strong, optically clear gasket and sealing materials.

One method for forming a reinforced elastomeric composite includes forming an elastomer into films and laminating the elastomer films to microfibers or microfibrous articles. The films, for example a pair of films, may be laminated to both sides of a microfibrous article, forming a composite sandwich. Alternatively, two microfibrous articles may be laminated to a film, with the layers biased, if desired. Another method for forming a reinforced elastomeric composite can include mixing a solution of the elastomer with a microfibrous pulp. The solution can be cast into films, the solvent evaporated, and the elastomeric film allowed to cure. Any bubbles in the composite may be at least partially removed by heating the composite, for example at about 100° C., in one method. The resulting product can be homogenous, optically clear sheets, which may be suitable for use as seals or gaskets, having little or no visible indication of the microfibrous reinforcement within.

Microfibers and microfibrillated articles can be treated to enhance the properties of the microfibers. Examples of treatments include application of one or more coupling agents, flame treating, corona discharge, plasma etching, and plasma priming. Microfibers may also be coated to provided desired properties, as discussed further below. In some embodiments, microfibers are coated with a polymer dissimilar to the microfiber. In one such embodiment, microfibers are coated with epoxy, enhancing the ability to bind to other microfibers or to other fibers. In one composite article according to the present invention, microfibers are coated, with the coated microfibers adhering together to form a substantially continuous reinforcement phase having a substantial void volume. The void volume may be substantially filled with the matrix phase, which may or may not be continuous, depending on the embodiment. Some composites according to the present invention include a matrix phase having a substantial void volume, typically filled with gas or air bubbles, or glass, polymeric or ceramic microspheres.

Thermoplastic polymers may be used to form the composite matrix or bulk phase. Thermoplastic polymers which may be used in the present invention include but are not limited to melt-processable polyolefins and copolymers and blends thereof, styrene copolymers and terpolymers (such as Kraton™), ionomers (such as Surlin™), ethyl vinyl acetate (such as Elvax™), polyvinylbutyrate, polyvinyl chloride, metallocene polyolefins (such as Affinity™ and Engage™), poly(alpha olefins) (such as Vestoplast™ and Rexflex™), ethylene-propylene-diene terpolymers, fluorocarbon elastomers (such as THV™ from 3M Dyneon), other fluorine-containing polymers, polyester polymers and copolymers (such as Hytrel™), polyamide polymers and copolymers, polyurethanes (such as Estane™ and Morthane™), polycarbonates, polyketones, and polyureas.

Useful polyamide polymers include, but are not limited to, synthetic linear polyamides, e.g., nylon-6 and nylon-66, nylon-11, or nylon-12. It should be noted that the selection of a particular polyamide material might be based upon the physical requirements of the particular application for the resulting reinforced composite article. For example, nylon-6 and nylon-66 offer higher heat resistant properties than nylon-11 or nylon-12, whereas nylon-11 and nylon-12 offer better chemical resistant properties. In addition to those polyamide materials, other nylon materials such as nylon-612, nylon-69, nylon-4, nylon-42, nylon-46, nylon-7, and nylon-8 may also be used. Ring containing polyamides, e.g., nylon-6T and nylon-61 may also be used. Polyether containing polyamides, such as PEBAX polyamides (Atochem North America, Philadelphia, Pa.), may also be used.

Polyurethane polymers which can be used include aliphatic, cycloaliphatic, aromatic, and polycyclic polyurethanes. These polyurethanes are typically produced by reaction of a polyfunctional isocyanate with a polyol according to well-known reaction mechanisms. Commercially available urethane polymers useful in the present invention include: PN-04 or 3429 from Morton International, Inc., Seabrook, N.H., and X4107 from B.F. Goodrich Company, Cleveland, Ohio.

Also useful are polyacrylates and polymethacrylates which include, for example, polymers of acrylic acid, methyl acrylate, ethyl acrylate, acrylamide, methylacrylic acid, methyl methacrylate, n-butyl acrylate, and ethyl acrylate, to name a few.

Other useful substantially extrudable hydrocarbon polymers include polyesters, polycarbonates, polyketones, and polyureas. These materials are generally commercially available, for example: SELAR® polyester (DuPont, Wilmington, Del.); LEXAN® polycarbonate (General Electric, Pittsfield, Mass.); KADEL® polyketone (Amoco, Chicago, Ill.); and SPECTRIM® polyurea (Dow Chemical, Midland, Mich.).

Useful fluorine-containing polymers include crystalline or partially crystalline polymers such as copolymers of tetrafluoroethylene with one or more other monomers such as perfluoro(methyl vinyl)ether, hexafluoropropylene, perfluoro(propyl vinyl)ether; copolymers of tetrafluoroethylene with ethylenically unsaturated hydrocarbon monomers such as ethylene, or propylene.

Still other fluorine-containing polymers useful in the invention include those based on vinylidene fluoride such as polyvinylidene fluoride; copolymers of vinylidene fluoride with one or more other monomers such as hexafluoropropylene, tetrafluoroethylene, ethylene, propylene, etc. Still other useful fluorine-containing extrudable polymers will be known to those skilled in the art as a result of this disclosure.

Polyolefins represent a class of extrudable polymers that are particularly useful in the present invention. Useful polyolefins include the homopolymers and copolymers of olefins, as well as copolymers of one or more olefins and up to about 30 weight percent, but preferably 20 weight percent or less, of one or more monomers that are copolymerizable with such olefins, e.g., vinyl ester compounds such as vinyl acetate. The olefins have the general structure $CH_2=CHR$, where R is a hydrogen or an alkyl radical, and generally, the alkyl radical contains not more than 10 carbon atoms and preferably one to four carbon atoms. Representative olefins are ethylene, propylene, butylene, and butene-1. Representative monomers which are copolymerizable with the olefins include 1-butene, 1-octene, 1-hexene, 4-methyl-1-pentene, propylene, vinyl ester monomers such as vinyl acetate, vinyl propionate, vinyl butyrate, vinyl chloroacetate, vinyl chloropropionate, acrylic and alpha-alkyl acrylic acid monomers, and their alkyl esters, amides, and nitriles such as acrylic acid, methacrylic acid, ethacrylic acid, methyl acrylate, ethyl acrylate, N, N-dimethyl acrylamide, methacrylamide, acrylonitrile, vinyl aryl monomers such as styrene, o-methoxystyrene, p-methoxystyrene, and vinyl naphthalene, vinyl and vinylidene halide monomers such as vinyl chloride, vinylidene chloride, vinylidene bromide, alkyl ester monomers of maleic and fumaric acid such as dimethyl maleate, diethyl maleate, vinyl alkyl ether monomers such as vinyl methyl ether, vinyl ethyl ether, vinyl isobutyl ether, 2-chloroethyl vinyl ether, and vinyl pyridine monomers.

Extrudable hydrocarbon polymers also include the metallic salts which contain free carboxylic acid groups. Illustrative of the metals which can be used to provide the salts of the carboxylic acid polymers are mono-, di-, tri, and tetravalent metals such as sodium, lithium, potassium, calcium, magnesium, aluminum, barium, zinc, zirconium, beryllium, iron, nickel and cobalt.

Representative examples of polyolefins useful in this invention are polyethylene, polypropylene, polybutylene, poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene1.

Representative blends of polyolefins useful in this invention are blends containing polyethylene and polypropylene, low-density polyethylene and high- density polyethylene, and polyethylene and olefin copolymers containing the copolymerizable monomers, some of which are described above, e.g., ethylene and acrylic acid copolymers; ethyl and methyl acrylate copolymers; ethylene and ethyl acrylate copolymers; ethylene and vinyl acetate copolymers-, ethylene, acrylic acid, and ethyl acrylate copolymers, and ethylene, acrylic acid, and vinyl acetate copolymers.

The preferred polyolefins are homopolymers of ethylene and propylene and copolymers of ethylene and 1-butene, 1-hexene, 1-octene, 4-methyl-1-pentene, propylene, vinyl acetate, and methyl acrylate. A preferred polyolefin is a homopolymer, copolymer, or blend of linear low-density polyethylene (LLDPE). Polyolefins may be polymerized using Ziegler-Natta catalysts, heterogeneous catalysts and metallocene catalysts.

Carboxyl, anhydride, or imide functionalities may be incorporated into the hydrocarbon polymer within the present invention, by polymerizing or copolymerizing functional monomers, for example, acrylic acid or maleic anhydride, or by modifying a polymer after polymerization, for example, by grafting, by oxidation or by forming ionomers. These include, for example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes. The carboxyl, anhydride, or imide functional polymers useful as the hydrocarbon polymer are generally commercially available. For example, anhydride modified polyethylenes are commercially available from DuPont, Wilmington, Del., under the trade designation BYNEL coextrudable adhesive resins.

The thermoplastic polymers include blends of homo- and copolymers, as well as blends of two or more homo- or copolymers. Miscibility and compatibility of polymers are determined by both thermodynamic and kinetic considerations. Common miscibility predictors for non-polar polymers are differences in solubility parameters or Flory- Huggins interaction parameters. For polymers with non-specific interactions, such as polyolefins, the Flory-Huggins interaction parameter can be calculated by multiplying the square of the solubility parameter difference by the factor (V/RT), where V is the molar volume of the amorphous phase of the repeated unit V=M/δ (molecular weight/density), R is the gas constant, and T is the absolute temperature. As a result, Flory-Huggins interaction parameter between two non-polar polymers is always a positive number. Thermodynamic considerations require that for complete miscibility of two polymers in the melt, the Flory-Huggins interaction parameter has to be very small (e.g. less than 0.002 to produce a miscible blend starting from 100,000 weight-average molecular weight components at room temperature). It is difficult to find polymer blends with sufficiently low interaction parameters to meet the thermodynamic condition of miscibility over the entire range of compositions. However, industrial experiences suggest that some blends with sufficiently low Flory-Huggins interaction parameters, although still not miscible based on thermodynamic considerations, form compatible blends.

Unlike miscibility, compatibility is difficult to define in terms of exact thermodynamic parameters, since kinetic factors, such as melt processing conditions, degree of mixing, and diffusion rates can also determine the degree of compatibility. Some examples of compatible polyolefin blends are: high-density polyethylene and ethylene alpha-olefin copolymers; polypropylene and ethylene propylene rubber; polypropylene and ethylene alpha-olefin copolymers; polypropylene and polybutylene.

Compatibility also affects film uniformity. Cast films that are made from compatible blends by the method of this invention may be transparent, which confirms the uniformity on a microscopic level.

Preferred thermoplastic polymers include polyamides, polyimides, polyurethanes, polyolefins, polystyrenes, aromatic polyesters, polycarbonates, polyketones, polyureas, polyvinyl resins, polyacrylates and polymethacrylates. Most preferred thermoplastic polymers include polyolefins, polystyrenes, and aromatic polyesters, because of their relatively low cost and widespread use.

The thermoplastic polymers may be used in the form of powders, pellets, granules, or any other melt-processible form. The particular thermoplastic polymer selected for use will depend upon the application or desired properties of the finished product. The thermoplastic polymer may be combined with conventional adjuvants such as light stabilizers, fillers, staple fibers, antiblocking agents and pigments.

Polymers used in the matrix phase may be normally melt-processable, and the melt processability of many common individual polymers can be predicted from melt flow indices and viscometry measurements. Normally melt-processable polymers are those that have a sufficiently low melt viscosity, i.e., a sufficiently high melt flow index, that they can be extruded through either a single screw extruder or a twin screw extruder without the aid of plasticizing materials. The actual melt flow index that is suitable depends on the type of polymer. Examples of some of the more common polymers of interest are as follows. High density polyethylene, for example, is considered melt-processable if it has a melt flow index above 4 dg/min (ASTM D1238-90b, Condition F, HLMI); and ethylene alpha-olefin copolymer and ethylene vinylalcohol copolymer are considered melt processable if they have a melt flow index above 0.5 dg/min (ASTM D1238-90b, Condition E). Polypropylene is considered melt-processable if it has a melt flow index above 0.2 dg/min (ASTM D1238-90b, Condition 1). Poly(ethylene chlorotrifluoro ethylene) is considered melt-processable if it has a melt flow index above 1.0 dg/min (ASTM D1238-90b, Condition J). Poly(vinylidene fluoride) is considered melt-processable if it has a melt flow index above 0.2 dg/min (ASTM D1238-90b, Condition L). Polymethylpentene is considered melt-processable if it has a melt flow index above 5 dg/min (ASTM D1238-90b, Condition 260 C, 5 kg load). Compatible blends of melt-processable polymers also are melt-processable.

In contrast, classes of polymers with melt flow indices far below values considered melt-processable for that polymer class generally are special grades that are not normally melt-processable and must be processed using special techniques, such as ram extrusion, or must be plasticized to enable processing with conventional extrusion equipment. Processing the polymer grades that are not normally melt-processable with a plasticizer requires longer residence times in the extruder to obtain desirable melt homogeneity and higher concentrations of a compound or compatible liquid in the melt to reduce extruder energy requirements. As a result, equipment productivity is significantly limited, the production costs increased, and the likelihood of thermal degradation increased.

One method for forming a reinforced theremoplastic composite includes forming an thermoplastic into films and laminating the films to microfibers or microfibrous articles. The films, for example a pair of films, may be laminated to both sides of a microfibrous article, forming a composite sandwich. Alternatively, two microfibrous articles may be laminated to a film, with the layers biased, if desired. Another method for forming a reinforced thermoplastic composite can include mixing a solution of the thermoplastic with a microfibrous pulp. The solution can be cast into films, the solvent evaporated, and the film allowed to cure. Any bubbles in the composite may be at least partially removed by heating the composite, for example at about 100° C., in one method. The resulting product can be homogenous, optically clear sheets, which may be suitable for use as seals or gaskets, having little or no visible indication of the microfibrous reinforcement within.

Thermoset polymers may be used to form the bulk or matrix phase of some embodiments of the present invention. As used herein, thermoset refers to a polymer that solidifies or sets irreversibly when cured. The thermoset property is associated with a crosslinking reaction of the constituents.

A polymer precursor or precursors may be provided to form the desired thermoset polymer. The polymer precursor or thermoset resin may comprise monomers, or may comprise a partially polymerized, low molecular weight polymer, such as an oligomer, if desired. Solvent or curative agent, such as a catalyst, may also be provided where required. In one method, the reinforcement provided is a microfibrous article, which may be coated with a polymer precursor, optionally as a solution and optional curative. The microfibrous article may be embedded in, or impregnated with, polymer precursor or resin. The polymer precursor solution solvent, if any, may be removed by evaporation. The evaporation and polymerization may take place until the polymerization is substantially complete.

One method according to the present invention includes adding polymer precursor to form a composite comprising a thermoset polymer having a microfiber reinforcement phase. The microfibers can be present in the form of a partially microfibrillated film, a fully microfibrillated film, or as a pulp. Where the thermoset polymer would form a rather brittle material without any reinforcement, the reinforcement can provide added toughness or fracture resistance. An exemplary, partial list of thermoset resins believed suitable for use with the present invention includes epoxy, vinyl ether, acrylate, methacrylate, hydrolyzable silane, polyester, phenolic, and urethane resins.

The reinforcement phase may be provided as pulp. The pulp may be admixed with the polymer precursor or resin, and optional curative, and formed into a desired shape. One method includes mixing the pulp, monomer, and curative, and casting the solution into the desired shape, followed by curing. Another method includes extruding or injection molding a mixture comprising microfibers in the form of a pulp, polymer precursor, and optional curative, followed by curing. The composition may be used in the manufacture of low cost reinforced structures such as recreational boats and small storage tanks using the method of spray chopping. By this method the microfibers are fed in a continuous tow with the resin into a chopping gun where they are blown with the matrix resin onto the forming surface, such as a mold. Upon curing, the article is released from the mold.

In addition, other manufacturing techniques may be used in including but not limited to, hand layup, resin transfer molding, pultrusion, compression molding, autoclave, vacuum bag technique and filament winding Suitable thermoset polymers include those derived from phenolic resins, epoxy resins, vinyl ester resins, vinyl ether resins, urethane resins, cashew nut shell resins, napthalinic phenolic resins, epoxy modified phenolic resins, silicone (hydrosilane and hydrolyzable silane) resins, polyimide resins, urea formaldehyde resins, methylene dianiline resins, methyl pyrrolidinone resins, acrylate and methacrylate resins, isocyanate resins, unsaturated polyester resins, and mixtures thereof.

Epoxy (epoxide) monomers and prepolymers are commonly used in making thermoset epoxy materials, and are well known in the art. Thermosettable epoxy compounds can be cured or polymerized by cationic polymerization. The epoxy-containing monomer can also contain other epoxy compounds or blends of epoxy containing monomers with thermoplastic materials. The epoxy-containing monomer may be blended with specific materials to enhance the end use or application of the cured, or partially cured, composition.

Useful epoxy-containing materials include epoxy resins having at least one oxirane ring polymerizable by a ring opening reaction. Such materials, broadly called epoxides, include both monomeric and polymeric epoxides, and can be aliphatic, cycloaliphatic, or aromatic. These materials generally have, on the average, at least two epoxy groups per molecule, and preferably have more than two epoxy groups per molecule. The average number of epoxy groups per molecule is defined herein as the number of epoxy groups in the epoxy-containing material divided by the total number of epoxy molecules present. Polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e. g., a glycidyl methacrylate polymer or copolymer). The molecular weight of the epoxy-containing material may vary from 58 to about 100,000 or more. Mixtures of various epoxy-containing materials can also be used.

Phenolic resins are low cost, heat resistant, and have excellent physical properties. Acid cure resole phenolic resins are disclosed in U.S. Pat. No. 4,587,291. Phenol resins used in some embodiments of the invention can have a content of monomeric phenols of less than 5%. The resins can also be modified additionally with up to 30% of urea, melamine, or furfuryl alcohol, according to known methods.

Phenol resoles are alkaline condensed, reaction products of phenols and aldehydes, wherein either mono- or polynuclear phenols may be used. In further detail, mononuclear phenols, and both mono- and polyfunctional phenols, such as phenol itself, and the alkyl substituted homologs, such as o-, m-, p-cresol or xylenols, are suitable. Also suitable are halogen-substituted phenols, such as chloro- or bromophenol and polyfunctional phenols, such as resorcinol or pyrocatechol. The term "polynuclear phenols" refers, for example, to naphthols, i.e., compounds with fused rings. Polynuclear phenols may also be linked by aliphatic bridges or by heteroatoms, such as oxygen. Polyfunctional, polynuclear phenols may also provide suitable thermosetting phenyl resoles.

The aldehyde component used to form the phenol resoles can be formaldehyde, acetaldehyde, propionaldehyde, or butyraldehyde, or products that release aldehyde under condensation conditions, such as, for example, formaldehyde bisulfite, urotropin, trihydroxymethylene, paraformaldehyde, or paraldehyde. The stoichiometric quantities of phenol and aldehyde components can be in the ratio of 1:1.1 to 1:3.0. The resins can be used in the form of aqueous solutions with a content of non-volatile substances of 60 to 85%.

Oxetane ring monomers may also be used to form the matrix phase thermoset polymers. Oxetane (oxacyclobutane) rings behave somewhat like epoxy (oxirane) rings in that catalysts and/or co-curatives, sometimes referred to as crosslinking agents, can be used to open the ring and link two or more chains together to form a crosslinked polymer. For example, polycarboxylic acid anhydrides and other polyfunctional compounds such as polyamines, polycarboxylic acids, polymercaptans, polyacid halides, or the like are capable of linking two or more oxetane sites just as epoxy sites are linked by epoxide cocuratives. The result is an increased amount of three-dimensional structure in the crosslinked or cured polymer, and hence an increased amount of rigidity of the polymer structure.

Thermosettable compositions may include components that have a radiation or heat crosslinkable functionality such that the composition is curable upon exposure to radiant curing energy in order to cure and solidify, i.e. polymerize and/or crosslink, the composition. Representative examples of radiant curing energy include electromagnetic energy (e.g., infrared energy, microwave energy, visible light, ultraviolet light, and the like), accelerated particles (e.g., electron beam energy), and/or energy from electrical discharges (e.g., coronas, plasmas, glow discharge, or silent discharge).

Radiation crosslinkable functionality refers to functional groups directly or indirectly pendant from a monomer, oligomer, or polymer backbone that participate in crosslinking and/or polymerization reactions upon exposure to a suitable source of radiant curing energy. Such functionality generally includes not only groups that crosslink via a cationic mechanism upon radiation exposure but also groups that crosslink via a free radical mechanism. Representative examples of radiation crosslinkable groups suitable in the practice of the present invention include epoxy groups, (meth)acrylate groups, olefinic carbon-carbon double bonds, allylether groups, styrene groups, (meth)acrylamide groups, combinations of these, and the like.

Thermosetting polymeric elastomers may also be used to form the matrix phase of composites according to the present invention. Useful thermosetting polymeric elastomers include crosslinked polyurethanes, crosslinked acrylates, crosslinked natural rubber, crosslinked synthetic rubbers, crosslinked epichlorohydrin, crosslinked chlorosulfonated polyethylene, crosslinked ethylene-acrylic, and the like.

Thermoset polymers preferred for use in microfiber-reinforced composites of the present invention include those derived from curing epoxy resins, vinyl ether resins, vinyl ester resins, unsaturated polyester resins, and isocyanate functional urethane resins.

Microfibrillated articles of the present invention may be coated with other materials, for example, polymeric materials or polymer precursors described above, coupling agents such as silanes and zirconates, conductive materials such as indium/tin oxide, and the like. The coatings may be sufficiently thin layers on the microfibers so as to preserve some or all of the surface features of the microfibrillated article or sufficiently thick so as to fill or partially fill the spaces between the microfibers. The thinly coated layers can be used to impart such properties as improved chemical or physical bonding between microfibers and polymeric materials or increased conductivity in a microfiber reinforced composite. Thicker coatings, which at least partially fill the spaces between the microfibers, can be used to bond the microfibers to each other within the same microfibrillated article and between microfibrillated articles such as in layups. As well, the thicker coatings may be used to bond the microfibers to other fibers such as carbon, glass, and Kevlar™ for additional stiffness.

Various techniques are known for coating substrates with thin layers of polymeric materials. In general, techniques may be divided into three groups, including liquid coating methods, gas-phase coating methods, and monomer vapor coating methods. As discussed below, some of these methods have been used to coat articles that have very small surface feature profiles. The thin layer liquid coating methods generally include applying a solution or dispersion of a polymer or polymer precursor onto the microfibers. Polymer or polymer precursor application is generally followed by evaporating the solvent (if applied from a solution or dispersion) and/or hardening or curing to form a polymer coating. The evaporation step, however, commonly requires significant energy and process time to ensure that the solvent is disposed of in an environmentally sound manner. During the evaporation step, localized factors, which include viscosity, surface tension, compositional uniformity, and diffusion coefficients, can affect the quality of the final polymer coating. Thin layer liquid coating methods include the techniques commonly known as knife, bar, slot, slide, die, roll, or gravure coating. Coating quality generally depends on mixture uniformity, the quality of the deposited liquid layer, and the process used to dry or cure the liquid layer.

Gas-phase coating methods generally include physical vapor deposition (PVD), chemical vapor deposition (CVD), and plasma deposition methods. These techniques commonly involve generating a gas-phase coating material that condenses onto or reacts with a substrate surface. The methods are typically suitable for coating films, foils, and papers in roll form, as well as coating three-dimensional objects Various gas-phase deposition methods are described in "Thin Films: Film Formation Techniques," Encyclopedia of Chemical Technology, 4th ed., vol. 23 (New York, 1997), pp. 1040–76.

Monomer vapor coating methods may be described as a hybrid of the liquid and gas phase coating methods. Monomer vapor coating methods generally involve condensing a liquid coating out of a gas-phase and subsequently solidifying or curing it on the substrate. Liquid coating generally can be deposited with high uniformity and can be quickly polymerized to form a high quality solid coating. The coating material is often comprised of radiation-curable monomers. Electron-beam or ultraviolet irradiation is frequently used in the curing, see, for example, U.S. Pat. No. 5,395,644. The liquid nature of the initial deposit makes monomer vapor coatings generally smoother than the substrate. These coatings therefore can act as a smoothing layer to reduce the roughness of a substrate (see, for example, J. D. Affinito et al., "Polymer/Polymer, Polymer/Oxide, and Polymer/Metal Vacuum Deposited Interference Filters", Proceedings of the 10 International Conference on Vacuum Web Coating, pp. 207–20 (1996)). Reducing the roughness of the microfiber substrate surface may be undesirable for some characteristics, but desirable or tolerable for others.

The production of high quality articles can include applying a thin film of a coating solution onto a continuously moving substrate or web. Thin films can be applied using a variety of techniques including: dip coating, forward and reverse roll coating, wire wound rod coating, blade coating, slot coating, slide coating, and curtain coating. Coatings can be applied as a single layer or as two or more superimposed layers. Although it is usually most convenient for the substrate to be in the form of a continuous web, it may also be formed of a succession of discrete sheets.

Thicker coatings of polymer or polymer precursor (including any of the polymeric matrix compositions described above) can be applied to target microfibrillated articles using conventional coating techniques from solvent and aqueous solutions and dispersions, and 100% solids compositions where viscosity permits. Useful coating techniques include brush, roll, spray, spread, transfer roll, air knife, dip coating, forward and reverse roll coating, blade coating, slot coating, slide coating, and curtain coating. Special cases of roll coating include two-roll squeeze coating and nip-fed kiss-roll coating. The amount of resin applied may be controlled by the temperature of the resin when coated, the gap setting between the two coating rollers of the squeeze coater, the gap setting between the doctor blade and the single roller of the nip-fed kiss-roll coater, and by the speed of the moving microfiber containing web.

Subsequent to coating application, solvent, if present, is evaporated. If the coating is comprised of a thermoset resin, the resin is then cured by energy activation methods, such as application of uv light, visible light, electon beam, or heat to the coating. Care should be taken to avoid heating the coating to the melt temperature of the microfibers to prevent loss of orientation in the microfibers.

Microfibrous articles can be coated with a water-based binder. Examples of such binders include latexes incorporating acrylics, styrene/butadiene rubbers, vinylacetate/ethylenes, vinylacetate/acrylates, polyvinyl chloride, polyvinyl alcohols, polyurethanes, and vinylacetates. Such binders are typically applied to a web at 25 to 35 percent solids by any suitable coating method, including wire-wound rod, reverse roll, air knife, direct and offset gravure, trailing blade, print bond and spray coating methods. The binder is applied in amounts sufficient to provide the desired property of the ultimately formed material, these amounts being readily apparent to the skilled artisan in the nonwoven manufacturing field. For example, more binder may be applied to produce a stronger material of a similar construction.

Microfibers or microfibrous articles may be incorporated into a polymer or polymer precursor matrix to form a microfiber reinforced composite using lamination processes.

For example, one or more microfibrous articles can be applied or laminated to or sandwiched between polymeric or polymer precursor matrix phase layers and pressed together by such means as passing through a nip or compression between plates. It may be desirable to maintain the thickness of a coating laid down on the microfiber substrates during lamination by using spacers or shims. It may be further desirable to avoid air entrainment during lamination, as such entrainment causes bubbles to develop in the laminate structure by reducing the viscosity of the polymeric or polymer precursor layers and modifying the surface energy of the microfibers and/or surface tension of the layers to allow sufficiently rapid wetting of the microfibers and removal of air.

In general, the invention can include a method of preparing a composite laminate that includes introducing a microfibrous article having first and second surfaces supported at two or more points, into a lamination zone located between two of the support points. The microfibrous article is typically unsupported throughout the lamination zone. A polymeric or polymer precursor matrix layer, also having first and second surfaces, is introduced into the lamination zone as well. The matrix layer can pass around a lamination bar to position the first surfaces of the microfibrous article and matrix layer in a facing relationship with each other. At least one of the first surfaces may be provided with a coating capable of bonding to both the matrix layer and the microfibers of the microfibrous article. The lamination bar may be depressed to laminate the polymeric matrix layer to the microfibrous article. When the matrix layer is thermoplastic it is preferably heated to allow wetting of the microfibers and flow of the matrix layer into the microfibrous article. Alternatively the polymer may be diluted with solvent or monomer to effect wetting of the microfibers. As previously discussed, care should be taken to avoid heating the matrix layer to the melt temperature of the microfibers.

Microfiber reinforced composites may be used in the manufacture of lightweight, high strength articles or components. Microfiber reinforced composite articles may be prepared using a variety of techniques, for example, hand or automated layup of prepreg, filament winding, compression molding, and resin transfer molding. Of these techniques, hand or automated layup of prepreg is most common.

A prepreg can include a microfibrous article or reinforcement impregnated with an uncured or partially cured resin matrix. Such prepregs can be made in a variety of forms depending on the configuration of the microfibrous reinforcement. For example, when the microfibrous reinforcement comprises a bundle of microfibers (or tow), the prepreg is specifically referred to as a "towpreg". By way of another example, when the microfibrous reinforcement comprises a collimated series of microfiber bundles, the prepreg is specifically referred to as "prepreg tape". In the present invention, prepregs comprised of microfibrous reinforcement may be advantageously combined with prepregs made with engineering fibers such as those described above. This combination of materials possesses the stiffness or other properties derived from the engineering fibers as well as the low density, high surface area, toughness, and hydrophobicity offered by the microfibers.

Prepregs are typically supplied to part fabricators who convert the material into cured composite components using heat and pressure to cure the resin. For example, when the prepreg is in the form of a tape, the part fabricator cuts lengths of the tape and places them on a tool surface in the desired ply orientation. This operation can be done manually or automatically and is generally referred to as "layup".

When the tool has a complex or curved or vertical configuration, the prepreg preferably has good tack to hold the plies together and to the tool until layup is complete. The prepreg also preferably has good drape or conformability, allowing it to conform to the tool shape.

Preferably, the prepreg cures uniformly to provide composite parts having high glass transition temperatures. This allows the cured composite to withstand a variety of stresses, such as elevated temperatures, mechanical stresses, exposure to solvents, without loss of structural integrity. Epoxy resin compositions can be used as the resin matrix for prepregs.

The amount of microfibers or microfibrous article used in microfibrous reinforced composites of the present invention depends on end use requirements. However, significant reinforcement can be achieved with amounts as low as 0.5 weight percent. The preferred microfiber content for thermoplastic composites is about 0.5 to about 99 weight %, more preferably 1 to 80 weight percent.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention.

Test Procedure I—Modulus of Elasticity, Tensile Strength, and Elongation

Modulus of elasticity, tensile strength, and percent elongation at break were measured using an Instron tensile testing machine, Model 1122 (Instron Corp., Park Ridge, Ill.) equipped with a 5 KN load cell, Model 2511-317. A cross-head speed of 0.05 m/min was used for all testing unless otherwise noted. Tests were conducted at 23° C., unless otherwise specified.

Test Procedure II—Unnotched Cantilever Beam Impact Test

The unnotched cantilever beam impact was measured with a 2 pound hammer. The test was conducted according to ASTM D 256-90b, using test method E.

Test Procedure III—Falling Dart Impact Test

The instrumented falling dart impact test was done with ⅜ inch diameter tip that weighed 9.07 kg, according to ASTM D 1709, method B.

Test Procedure IV—Density Measurement

The density of samples was measured at 25 C in deionized water according to the method of ASTM D792-86. Samples were cut into 2.0 cm×2.0 cm pieces, weighed on a Mettler AG245 high precision balance (Mettler-Toledo, Inc., Hightstown, N.J.), and placed underwater. The volume of water displaced was measured using the density measurement fixture. The weight divided by the volume gave the density.

Test Procedure IV—Tensile Dynamic Mechanical Analysis

The DMA analysis was done with freestanding strips of each sample clamped in the jaws of a Seiko Instruments DMA 200 Rheometer (Seiko Instruments, Torrance, Calif.) equipped with a tensile sample fixture. The samples were tested from −50° to 200° C. at 2° C./minute and 1 Hz. Separation between the jaws was 20 mm.

Determination of Degree of Molecular Orientation in Oriented Polypropylene Film For purposes of demonstrating the molecular orientation in an oriented, microvoided polypropylene film used in the present invention WAXS diffraction data were collected by use of a Picker 4-circle diffractometer. The diffractometer was fitted with fixed entrance slits and a fixed receiving slit. A transmission data collection geometry was employed with the effective reference direction axis oriented vertically and coincident with the diffractometer 2θ axis. The X-ray generator was operated at settings of 40 kV and 25 mA. Specimens were mounted on aluminum holders using double coated adhesive tape with no backing plate or support used under the portion of the film exposed to the incident X-Ray beam. Polypropylene peak positions were located from survey step scans conducted from 5 to 35 degrees using a 0.05 degree step size and 30 second count time. Azimuthal step scans through the (110) maximum were conducted from instrument settings of −180 to +180 degrees using a three degree step size and 10 minute count time. The resulting scattering data were reduced to x-y pairs of azimuthal angle and intensity values and subjected to profile fitting using the data analysis software ORIGIN™ (ORIGIN™ version 4.1 available from Microcal Software Inc., One Roadhouse Plaza, Northhampton, Mass. 01060). A gaussian shape model was employed to describe observed intensity maxima in the azimuthal scans. Azimuthal widths measured in the profile filling procedures described above were taken as the full width at half maximum (FWHM) above a linear background model. The azimuthal width of the oriented polypropylene was thereby found to be 4.2°, a relatively low number resulting from a high degree of molecular orientation.

Preparation of Semi-Syndiotactic Polypropylene

Semi-syndiotactic polypropylene of 42.0% rrrr and gpc molecular weight, Mn=2.5e5 and Mw=7.1e5 was prepared as described in U.S. Ser. No. 08/956,880 (Siedle et al.) filed Oct. 23, 1997, now U.S. Pat. No. 6,265,512.

Examples 1–2

(Reinforced Elastomeric Polypropylene) and Comparative Example C1

Samples of semi-syndiotactic polypropylene were pressed into films ranging in thickness from 50.8 to 501 microns, using a Model C Carver Laboratory Press (Fred Carver Inc., Wabash, Ind.) with a 15.2×15.2 cm heated platten. The applied load was 6.895 Mpa, and the platten temperature either 121° C. or 177° C.

A microfibrillated web made by microfibrillating highly oriented polypropylene as described in Example 1 of U.S. Pat. No. 6,110,588 was sandwiched between two semi-syndiotactic polypropylene films having a thickness of 0.18 to 0.25 mm and pressed at 6.895 Mpa with the platen temperature at 121° C. to a thickness of 0.30 to 0.38 mm. Visual inspection of the resulting reinforced syndiotactic polypropyene composite sheet revealed that complete wetting of the microfiber bundles was not achieved. Samples having a width of 0.635 cm and a length of about 7.6 cm were cut from the composite sheet, some with the length dimension along the fiber axis and some with the length dimension transverse to the fiber axis. Samples were tested according to Test Procedure I, using a gage length of 2.54 cm. Another composite sheet was made and tested essentially as described above except that the platen temperature was 177° C. For comparison, control samples having a width of 0.635 cm and a length of about 7.6 cm were cut from the semi-syndiotactic polypropylene film described above having a thickness the same as the composite sheets and tested according to Test Procedure I. The results are shown in Table 1.

TABLE 1

Modulus of Elasticity, Tensile Strength, and % Elongation of Reinforced Syndiotactic Polypropyene Composite Sheets.

| Ex. | Orientation to Fiber Axis | Platten Temp. (° C.) | Modulus of Elasticity (MPa) | Tensile Strength (MPa) | Elongation at Break (%) |
|---|---|---|---|---|---|
| C1 | None | 121 | 10.07 +/− 0.14 | 4.6 +/− 0.1 | 575 +/− 25 |
| 1 | Parallel | 121 | 61.4 +/− 13.8 | 5.0 +/− 1.2 | 35 +/− 20 |
| 1 | Transverse | 121 | 3.93 +/− 0.17 | 2.2 +/− 0.3 | 1465 +/− 230 |
| 2 | Parallel | 177 | 40.1 +/− 18.6 | 3.9 +/− 1.6 | 60 +/− 35 |
| 2 | Transverse | 177 | 2.9 +/− 0.4 | 1.2 +/− 0.2 | 1275 +/− 180 |

The results in Table 1 show that the composite sheet had a much higher modulus than the control film without the microfiber web when stress was applied in the direction of the fiber axis. Mechanical properties are anisotropic depending on whether they are measured parallel or perpendicular to the fiber axis. When full wetting is achieved, the samples are transparent.

Examples 3–5

Comparative Example C2 (Microfiber Reinforced Thermoset Epoxy)

Microfiber reinforced thermoset samples were made using 1, 4 and 8 layers of cross-lapped microfibrillated web made by microfibrillating highly oriented polypropylene essentially as described in Example 1 of U.S. Pat. No. 6,110,588. The microfiber reinforcement web was measured to have a surface area of approximately 3.5 square meters per gram and a density of 0.10 g/cc. The microvoided highly oriented polypropylene film prior to fibrillation had a density of 0.7 g/cc.

ERL 4221 (a cycloaliphatic epoxy with a viscosity at room temperature of 400 cp, obtained from Union Carbide, Danbury, Conn.) was compounded with 2% by weight of triarylsulfonium hexafluoroantimonate (cationic catalyst R-23164, CAS#57840-38-7, in powder form, available from 3M, St. Paul, Minn.) in a stirred jacketed vessel at 100° C. for fifteen minutes. The resulting catalyzed epoxy resin was poured over the microfibrillated web (10 cm×10 cm), placed on silicone release-coated polyethylene terephthalate liner, and another release liner was placed on top of the resin/web combination. A roller was used to spread out the resin and wet the microfibers. A Model C Carver laboratory press was employed to rapidly eliminate visible bubbles from the coating. The sample was then placed between two thick glass plates so that the sample would stay flat and cured by exposing each side of the sample with a black light (350 bl bulb, Phillips) at a distance of one inch from the light source. A radiation dosage of 1 Joule per square centimeter was measured for each 5 minutes of exposure at this distance. The samples were allowed to sit overnight and then were further cured by exposing each side of the sample to a Fusion Systems D bulb three times at a pass rate of 10 ft/min. The samples were allowed to sit for a week prior to testing. A non-reinforced epoxy control sample was prepared by pouring the catalyzed epoxy resin into a rubber mold and curing as above. The tensile properties of the samples were obtained according to Test Method I. The distance between the grips was 1 inch. The samples were cut to a ½ inch width. Results are shown in Table 2.

Scanning electron micrographs of the fractured ends of the 4-layer (4-ply) samples were run. The micrographs showed microfibers protruding from the polymer matrix. Separate samples (10 cm×10 cm) were also tested for impact resistance according to Test Methods II and III, and results from these tests are shown in Tables 3, 4, and 5. For one set of samples the weight of the microfiber and the weight of epoxy were observed. For a one ply sample, there were 1.3 grams of microfiber web (about 10% by weight of the overall weight of the 1-ply composite) and 11.6 grams of epoxy resin. For a four ply sample, there were 5.38 grams of microfiber web (about 14% by weight of the overall weight of the 4-ply composite) and 31.98 grams of epoxy resin. The weights of the microfibers and epoxy were not measured in the 8 ply sample, but it was estimated to contain about 20% by weight of microfiber.

After the multiaxial impact testing by Test Method III, the damaged 4-layer samples were weighed and then immersed in water for several days. For comparison, an undamaged fiberglass mat with a polyolefinic binder (to improve moisture resistance) was prepared and treated the same. When the samples were removed from the water, they were weighed after draining and removing surface water by wiping the surface of the samples with an absorbent tissue. The results are shown in Table 6.

The density of portions of the 8 ply composite samples and the epoxy control samples were measured according to Test Method IV. The 8 ply samples were found to have a density of 1.158+/−0.008 g/cc. The density of the cured epoxy control was found to be 1.227+/−0.002 g/cc. The microfibers, therefore, provided a 6% reduction in weight relative to an equal volume of the cured epoxy control.

$$\text{Using } \rho_c = \frac{1}{(W_f/\rho_f) + (W_m/\rho_m)}$$

wherein W is weight fraction, ρ is density, subscript c is composite, subscript f is fiber, and subscript m is matrix, and assuming a 20% by weight content of polypropylene microfiber in the 8 ply samples with a microfiber density of 0.9 g/cc, the density of the composite was calculated to be 1.144 g/cc. Using a density of 2.54 g/cc for fiberglass, a sample made with fiberglass at the same 20% by weight was calculated to have a density of 1.369 g/cc. Therefore, this fiberglass-containing composite sample would be 20% heavier than one with the same loading (20% by weight) of polypropylene microfibers.

TABLE 2

Tensile Properties of Microfiber Reinforced Epoxy Composite Strips.

| Ex. | Number of Layers | Sample[1] Orientation | Modulus (MPa) | Tensile Strength (MPa) | Elongation (%) | Energy to Break (mJ) |
|---|---|---|---|---|---|---|
| C2[2] | 1 | None (No microfibers) | 190 +/− 124 | 1.65 +/ 1.38 | 2.3 +/− 1.0 | 11 +/− 11 |
| C3 | 1 (no resin)[3] | MD | 1142 +/− 482 | 37.2 +/− 15.9 | 7.7 +/− 1.3 | 180 +/− 45 |
| 3 | 1 | MD | 1896 +/− 82 | 29.6 +/− 3.4 | 2.5 +/− 0.3 | 68 +/− 23 |

TABLE 2-continued

Tensile Properties of Microfiber Reinforced Epoxy Composite Strips.

| Ex. | Number of Layers | Sample[1] Orientation | Modulus (MPa) | Tensile Strength (MPa) | Elongation (%) | Energy to Break (mJ) |
|---|---|---|---|---|---|---|
| 3 | 1 | TD | 867 +/− 186 | 10.3 +/− 3.4 | 1.4 +/− 0.1 | 11 +/− 11 |
| 4 | 4 | MD and TD | 1130 +/− 103 | 24.8 +/− 1.65 | 3.8 +/− 0.3 | 339 +/− 23 |

[1]Orientation of microfibers in sample, where MD was in the direction of applied stress and TD was transverse to the direction of applied stress.
[2]Samples of epoxy alone were too brittle to be tensile tested on the Instron. Separate samples of epoxy alone made with 1 weight % of triarylsulfonium hexafluoroantimonate and cured with a light dosage of 0.5 J/cm2 and several hours of heating in an oven gave a modulus of 572 Mpa and a tensile strength of 33.8 Mpa.
[3]Microfiber web without any resin applied to the microfibers.

The results in Table 2 show that samples containing the microfibers had a higher modulus, higher tensile strength and improved toughness than those without the microfibers.

TABLE 3

Unnotched Cantilever Beam Impact Properties of Microfiber Reinforced Epoxy Composite.

| Ex. | Number of Layers | Sample Weight[1] (g) | Energy[1] (mJ) | Specific Energy[2] (mJ/g) |
|---|---|---|---|---|
| C2 | 1 (No microfibers) | 1.26 | 7.91 | 6.28 |
| 3 | 1 | 0.60 | 4.52 | 7.53 |
| 4 | 4 | 2.17 | 29.4 | 13.5 |

[1]Average of five trials.
[2]Energy absorbed per gram sample weight.

The results in Table 3 show that the samples containing microfibers had greater impact resistance, as shown by the increased energy absorbed per gram sample weight, than the control samples without microfibers.

TABLE 4

Falling Dart[1] Impact Properties of Microfiber Reinforced Epoxy Composite.

| Ex. | Number of Layers | Sample Thickness (mm) | Energy to Maximum Load (J) | Total Energy (J) | Total Energy/ Thickness (J/mm) |
|---|---|---|---|---|---|
| C2 | 1 | 3.5 | 0.53 | 0.94 | 0.27 |
| 3 | 1 | 1.1 | 0.03 | 0.13 | 0.12 |
| 4 | 4 | 2.6 | 2.08 | 3.66 | 1.41 |

[1]Impact energy of 62.1 +/− 0.5 and tup velocity of 3.70 m/sec used.

The results on Table 4 show that the composites containing the microfibers in 0/90 cross direction (direction of microfibers in each layer 90° to microfibers in adjacent layer) were able to sustain much greater impact energy than the control with no microfibers. The composite containing one layer of microfibers sustained a lower impact energy, because the fibers were in one direction.

TABLE 5

Falling Dart[1] Impact Properties of Microfiber Reinforced Epoxy Composite.

| Ex. | Number of Layers | Sample Thickness (mm) | Maximum Force (N) | Total Energy (J) | Total Energy/ Thickness (J/mm) |
|---|---|---|---|---|---|
| 4 | 4 | 2.66 | 0.96 | 4.01 | 1.51 |
| 4 | 4 | 2.76 | 0.56 | 2.27 | 0.82 |
| 4 | 4 | 3.47 | 0.65 | 2.46 | 0.71 |
| 4 | 4 | 2.23 | 0.55 | 2.62 | 1.18 |
| 4 | 4 | 2.60 | 0.48 | 2.22 | 0.86 |
| 4 | 4 | 2.38 | 0.44 | 2.56 | 1.08 |
| 5 | 8 | 4.42 | 2.00 | 9.49 | 2.15 |
| 5 | 8 | 3.89 | 1.51 | 7.90 | 2.03 |
| 5 | 8 | 3.87 | 1.45 | 7.15 | 1.85 |

[1]Tup velocity of 3.34 m/sec used.

The results in Table 5 show that the composites containing 8 layers consistently sustained significantly greater impact energy per thickness than the composites containing 4 layers.

TABLE 6

Water Absorption of Microfiber Reinforced Thermoset Epoxy Composites.

| | | Weight Gain (%) | | |
|---|---|---|---|---|
| Ex. | Fiber Type | After 1 Day | After 3 Days | After 1 Week |
| C3 | Fiberglass | 8 | 9 | 9 |
| 4 | Microfiber | 1 | 1.2 | 2 |

The results in Table 6 show that the microfiber containing composite absorbed very little water even though the cured cycloaliphatic epoxy resin matrix was comprised of very hydrolytically unstable oxygen linkages. By comparison, the fiberglass-containing composite absorbed much more water even though it was comprised of a hydrophobic matrix. The 2% water absorption in the microfiber composite shown after one week may have been primarily due to epoxy matrix damage.

Example 6–8

Comparative Example C3 (Microfiber Reinforced Thermoset Epoxy/Polyol)

Microfiber reinforced thermoset samples were made using one layer of 5.1 cm×5.1 cm squares of microfibrillated web (made by microfibrillating highly oriented polypropylene essentially as described in Example 1 of U.S. Pat. No. 6,110,588) with various amounts of thermoset resin. An epoxy/polyol thermoset resin was prepared essentially as in Example 3 by combining ERL 4221™ at 80% by weight with Tone 0201™ (a difunctional polycaprolactone polyol from Union Carbide) at 20% by weight. Triarylsulfonium hexafluoroantimonate (CD1010, a cationic photoinitiator, from Sartomer, Exton, Pa.), was used at 2% by weight. The microfiber reinforcement square was placed on release PET liner with silicone release. The epoxy/polyol composition was poured onto the mat and release liner was placed on top and then a roller was used to spread out the resin and wet the microfibers. A Model C Carver laboratory press was heated to 100° F. and used to wet the fibers and remove any bubbles. A bank of Phillips 350 bl bulbs were used to cure the composition for 10 minutes (2 $J/cm^2$ total dose, 3.6 $mW/cm^2$). Non-reinforced epoxy/polyol control samples (0.18 mm in thickness) was prepared by pouring the catalyzed epoxy/polyol resin into a rubber mold and curing as above. The tensile properties of the resulting samples were obtained according to Test Method I using samples having a length of ~5.1 cm and a width of 6.4+/−0.1 mm. The distance between the grips was 1 inch and the crosshead speed was 20 mm/min. The results are shown in Table 7.

TABLE 7

Tensile Properties of Microfiber Reinforced Thermoset Epoxy/Polyol.

| Ex. | Wt. MF (g) | Wt. Resin (g) | Wt. % MF | Th. (mm) | Modulus (Mpa) | Tensile Strength (Mpa) | Elongation (%) | Energy to Break (mJ) |
|---|---|---|---|---|---|---|---|---|
| C3 | 0 | ~2 | 0 | NA | 1489 +/− 786 | 15 +/− 11 | 1.3 +/− 0.7 | 16 +/− 18 |
| 6 | 0.3472 | 1.913 | 15 | 0.249 | 3351 +/− 354 | 94 +/− 19 | 5.0 +/− 0.9 | 396 +/− 132 |
| 7 | 0.3514 | 1.643 | 18 | 0.232 | 3420 +/− 318 | 96 +/− 13 | 5.0 +/− 0.9 | 384 +/− 132 |
| 8 | 0.2900 | 0.9158 | 24 | 0.129 | 3792 +/− 696 | 105 +/− 27 | 5.4 +/− 1.4 | 225 +/− 77 |

Wt. = weight.
MF = microfibers.
Th. = thickness of test sample.

The results in Table 7 show that modulus of composites containing microfibers was significantly greater than that of the control thermoset sheet without microfibers and that the microfibers improved the tensile properties of the thermoset sheet.

Example 9

(Thermoset Epoxy Coated Microfiber Articles) and Comparative Example C4

Samples of microfibrillated web employed in Example 1 were coated with a solution of ERL 4221™ epoxy with 2% triarylsulfonium hexafluoroantimonate dissolved therein. The samples were allowed to drain for 0.5 hour and were subsequently cured by exposure on each side with three passes at 0.3 m/minute under a Fusion Systems D bulb. The samples were allowed to sit for one week prior to testing. Control samples of cured epoxy sheets were made by pouring the ERL 4221™ epoxy with 2% triarylsulfonium hexafluoroantimonate into a silicon lined polyester mold, and then curing initially with 4 passes at 1.37 m/minute under a 300 W Fusion Systems D Bulb. The resulting initially cured control samples were then covered with a glass plate and exposed to the following cure cycle: 15 minutes @ 50°, 75°, 100°, 120° and 140° C.

The thermoset epoxy coated microfiber samples, the cured epoxy control samples, and microfibrillated web samples were subjected to Test Method IV. E' values at three temperatures were taken from a tensile dynamic mechanical frequency slice and are shown in Table 8.

TABLE 8

Tensile Dynamic Mechanical Analysis of Epoxy Coated Microfiber Article.

| | | Modulus E' (Pa) | |
|---|---|---|---|
| Ex. Composition | 0° C. | 50° C. | 100° C. |
| C3 Microfibers Only | $1 \times 10^8$ | $6 \times 10^7$ | $6 \times 10^7$ |
| C4 Cured Epoxy Only | $2 \times 10^9$ | $1.5 \times 10^9$ | $1 \times 10^9$ |
| 9 Microfibers Coat w Cured Epoxy | $1 \times 10^9$ | $0.5 \times 10^9$ | $8 \times 10^8$ |

The results in Table 8 show that the epoxy coating added stiffness to the microfibrillated article. The high surface area of the microfibers provided a good surface for the cured resin coating and did not require any primer.

Example 10

Microfiber Reinforced Moisture Cured Urethane Composite and Casting Article

A moisture curable urethane resin was prepared by mixing together under dry nitrogen the following components and stirring at about 60° C. for about one hour, all amounts shown in parts by weight:

| | |
|---|---|
| Isonate 2143L ™ (polyisocyanate from Dow Chemical Co., Midland, MI) | 55.18 |
| Benzoyl Chloride | 0.05 |
| ARCOL PPG 725 ™ (725 molecular weight polypropylene glycol from ARCO Chemical Co., Newtown Square, PA) | 42.36 |
| 4-(2-(1-methyl-2-(4-morpholinyl)ethoxy)ethyl)morpholine | 1.95 |
| 2,6-di(t-butyl)-4-methylphenol | 0.48 |
| DC Antifoam 1400 ™ (Dow Corning Corp., Greensboro, NC) | 0.18 |

Microfibrillated polypropylene webs made essentially as described in Example 1, but 95% microfibrillated, dimensioned 12 cm wide by 0.5 m long, were impregnated with the designated amount of the moisture curable urethane resin in a dry air room, rolled onto polyethylene cores, and heat sealed in aluminum foil lined pouches. After 24 hours, one of the rolled-up moisture curable urethane resin impregnated microfibrillated polypropylene webs (2.7 g microfiber web, 26.9 g resin, 90.9 weight % resin) was removed from the pouch, dipped in a pail of room temperature water for 5 seconds, and wrapped around a stockinet-covered 5.1 cm diameter steel mandrel to create a 3 layer composite tube. The resin cured very slowly, demonstrating the hydrophobicity imparted by the microfibers as well as high resin content. Another sample (3.67 g microfiber web, 22.48 g resin, 86 weight % resin) was unrolled, then dipped in water, and formed into a composite tube as with the previous sample. The second sample was fully cured to a rigid, lightweight tube in 4 hours. These composite materials were determined to be useful for immobilization of broken bones, joints, and limbs.

Example 11

Three Ply Unidirectional Polypropylene Microfiber Reinforced Epoxy Composite

A three-ply unidirectional laminate was fabricated using a vacuum bag technique. Three polypropylene microfiber layers, made as in Example 10, dimensioned 25.4 cm by 45.7 cm, and unidirectionally oriented with respect to each other, were impregnated with a total of 200 g of a commercial epoxy laminating resin (CER- 112™ manufactured by Adtech Plastic Systems Corp., Charlotte, Mich.). A resin/hardener (hardener supplied with the resin by the manufacturer) mix ratio of 100/22 parts by weight was used. The three layers of resin impregnated microfibrillated polypropylene were sandwiched between two aluminum plates (coated with a release agent) and cured for 24 hours at room temperature with an applied vacuum of 63.5 torr. The final 25.4 cm×45.7 cm laminate was 20.3 mm thick. It should be noted that in this process, the amount of resin in the final laminated composite is lowered, because some of the resin is squeezed out during the densification process with the applied vacuum. A very stiff and tough composite resulted.

Example 12

Microfibrillated Polypropylene/E-Glass Hybrid Composite

A composite was fabricated using a hand lay up technique using the resin system and microfibers described in Example 11. A 5-ply symmetric laminate was constructed with the inner three layers being polypropylene microfibers and the outer layers being a 0/90 woven E-glass fabric (available from Fibre Glast Developments Corporation, Brookville, Ohio. An SEM of a freeze fracture cross section of the resulting 5-ply laminate sample was run. The micrograph showed microfibers and E-glass fibers protruding from the polymer matrix.

This example illustrated the use of the microfibers as a core material in a composite structure. The outer lamina (furthest away from the neutral axis of the laminate) were composed of the glass fibers which had significantly higher modulus and strength values relative to the propylene microfibers. This further illustrates the preparation of hybrid composites, realizing weight reduction that is critical to performance in many applications such as a boat or automobile components. The polypropylene microfibers of this invention have a significantly lower density compared to traditional engineering fibers (e.g., E-glass (2.5 g/cc) is 2.77 times more dense than polypropylene microfibers (0.9 g/cc)).

Example 13

Microfibrillated Polypropylene Cross-ply Laminate

A symmetric four-ply laminate was constructed by hand lay up using the microfibrillated polypropylene web and resin system of Example 11. The impregnated web layers were stacked on a polypropylene release film to form the laminate and cured for 24 hours at 75° F. The stacking sequence was [0/90].

Example 14

Quasi isotropic Microfibrillated Polypropylene Laminate

A four-ply laminate was fabricated by hand lay up and cured in the same manner as in Example 13. The stacking sequence was [0, ±45°, 90°].

Example 15

Hybrid Interply Laminate

A five-ply alternating interply laminate was constructed by hand lay up as in Example 13. The center ply and two outer plies were resin impregnated microfibrillated polypropylene layers with the fibers in the 0° direction. The second and fourth layers were resin impregnated Kevlar™ 49 cross ply weave (0°, 90°) (available from Fibre Glast Developments Corporation, Brookville, Ohio). The laminates of this example were useful for lightweight structures where impact resistance was desired.

Example 16

Carbon Fiber Hybrid Composite

A hybrid composite was fabricated by impregnating two unidirectional microfibrillated polypropylene web layers (made as described in Example 11) and two Torayca T700 unidirectional 12K carbon fiber fabric layers (available from Toray Carbon Fibers America, Inc., Santa Ana, Calif.) with the premixed CER-112 resin system described in Example 11. A layer of impregnated T700 fabric was placed one each side of a ¾ inch low density polyurethane foam core (available from General Plastics Manufacturing Co., Tacoma, Wash.). A layer of resin impregnated unidirectional microfibrillated polypropylene web was placed over each layer of carbon fabric such that all layers were in the same direction. The final composite was symmetric about the midplane of the urethane core with the microfibrillated polypropylene being the outer lamina of the structure. The high modulus carbon fibers were responsible for the high stiffness of the composite, and the primary function of the microfibrillated polypropylene layers was to impart abrasion resistance and provide protection to the composite structure. Because the modulus of the carbon fiber is about 22 times higher than the microfibrillated polypropylene, the microfibers are subjected to only small stresses in a load bearing application. This example showed the use of the microfiber layer as a surface veil, protecting the underlying carbon fiber layer from abrasion, chemicals, and low velocity impact.

What is claimed is:

1. A composite article comprising:
   a polymer matrix; and
   a plurality of microfibers embedded in the matrix,
   wherein the microfibers are melt processed polymeric microfibers having an average effective diameter of less than 20 microns and a transverse aspect ratio of from 1.5:1 to 20:1.

2. A composite article as in claim 1, wherein the microfibers have a transverse aspect ratio of 3:1 to 9:1.

3. A composite article as in claim 1, wherein the microfibers have a cross-sectional area of 0.5 square microns to 3.0 square microns.

4. A composite article as in claim 1, wherein the microfibers have a cross-sectional area of 0.7 square microns to 2.1 square microns.

5. A composite article as in claim 1, wherein the microfibers have an average effective diameter of from 0.01 microns to 10 microns.

6. A composite article as in claim 1, wherein the microfibers are bundles of unitary fibrils, which in aggregate form microfibers.

7. A composite article as in claim 1, wherein the microfibers have a surface area of at least 3 square meters per gram.

8. A composite article as in claim 1, wherein the microfibers have a surface area of 0.5 to 30 square meters per gram.

9. A composite article as in claim 1, wherein the refractive index of the polymer matrix and the refractive index of the microfibers are substantially equal.

10. A composite article as in claim 1, wherein the microfibers and matrix have a sufficiently equal refractive index so as to render the composite article substantially transparent to visible light.

11. A composite article as in claim 1, wherein the microfibers and matrix each have refractive indices within about 10 percent of each other.

12. A composite article as in claim 1, wherein the microfibers arc oriented to a draw ratio of at least 10 to 1.

13. A composite article as in claim 1, further comprising engineering fibers.

14. A composite article as in claim 1 comprising two or more layers of microfibers.

15. A composite article as in claim 14, wherein microfibers of one layer are entangled with microfibers of another layer.

16. A composite article as in claim 14, wherein the outermost layers are comprised of microfibers.

17. A composite article as in claim 14, wherein the layers are biased.

18. A composite article as in claim 1, wherein the microfibers are formed from polypropylene fiber material oriented sufficiently to have an azimuthal width value of less than 10°.

19. A composite article as in claim 1, wherein the microfibers are formed from polypropylene fiber material oriented sufficiently to have an azimuthal width value of legs than 5°.

20. A composite article as in claim 1, wherein the matrix is formed of an elastomeric material.

21. A composite article as in claim 1, wherein the matrix is formed of a thermoplastic elastomeric material.

22. A composite article as in claim 1, wherein the matrix is formed of syndiotactic polypropylene.

23. A composite article as in claim 1, wherein the matrix is formed of a thermoset polymeric material.

24. A composite article as in claim 1, wherein the matrix and microfibers are both formed of polypropylene.

25. A composite article as in claim 1, wherein the microfibers are present as a pulp of free microfibers.

26. A composite article as in claim 1, wherein the composite article includes a microfibrillated article embedded in the polymer matrix.

27. A composite article as in claim 1, wherein the composite article includes at least two microfibrillated articles embedded in the matrix, wherein the microfibrillated articles are alternated with layers of matrix therebetween to form multiple substantially coplanar plies of microfibrillated articles and polymer matrix.

28. A composite article as in claim 27, wherein the microfibrillated articles are uniaxially oriented, and at least two of the microfibrillated articles are biased.

29. A composite article as in claim 1, wherein the composite article includes a plurality of microfibrillated article strips, wherein the microfibrillated article strips are embedded in the matrix material, wherein the microfibrillated article strips have an average width of between about 1.5 and $4 \times 10^8$ times the average cross sectional area of the microfibers.

30. A composite article as in claim 1, wherein the microfibers have treated fiber surfaces.

31. A composite article as in claim 1, wherein the microfibrous surfaces have been treated with methods selected from the group consisting of corona discharge, flame treating, plasma etching, plasma priming, and thin layer priming.

32. A composite article as in claim 1, wherein the microfibers have a surface coating.

33. A composite article as in claim 1, wherein the matrix is formed primarily of a matrix material and the fiber surfaces have a coating formed primarily of a coating material, wherein the coating material is dissimilar from the matrix material.

34. A composite article as in claim 33, wherein the coating material includes an epoxy material.

35. A composite article as in claim 33, wherein the coating material includes a coupling agent for coupling the fiber to the matrix material.

36. A composite article as in claim 1, wherein the matrix is a substantially continuous single phase.

37. A composite article as in claim 1, wherein the matrix has a substantial volume of discontinuities and the microfibers are coated and adhered to each other.

38. A composite article as in claim 1, wherein the matrix has a substantially continuous polymeric phase having a discontinuous gaseous phase dispersed therein.

39. A composite article as in claim 1, wherein the microfibers include a first plurality of microfibers formed from a first polymer and a second plurality of microfibers formed from a second polymer, wherein the first and second polymers are different polymers relative to each other.

40. A composite article as in claim 39, wherein the first polymer is polypropylene and the second polymer is polybutylene terephthalate.

41. A composite article comprising:

a polymeric matrix; and a plurality of polymeric microfibers embedded in the polymeric matrix, wherein the microfibers are melt processed polymeric microfibers having an average cross-sectional area of 0.5 square microns to 3.0 square microns, wherein the microfibers have a draw ratio of at least 5 to 1.

42. A composite article as in claim 41, wherein the microfibers have a surface area of at least 3 square meters per gram.

43. A composite article comprising:

a polymeric matrix; and a plurality of polymeric microfibers embedded in the polymeric matrix, wherein the microfibers are polymeric microfibers having an avenge cross-section area of 0.5 square microns to 3.0 square microns, wherein the microfibers have a tensile strength of at least 275 MPa.

44. A composite article as in claim 43, wherein the microfibers have a surface area of at least 3 square meters per gram.

45. A composite article comprising:

a polymeric matrix; and a plurality of polypropylene microfibers embedded in the polymeric matrix, wherein the polypropylene microfibers are melt processed polymeric microfibers having an average cross-sectional area of 0.5 square microns to 3.0 microns square, wherein the microfibers polypropylene is orientated sufficiently to have an azimuthal width of less than about 5°.

46. A composite article as in claim 45, wherein the microfiber have a surface area of at least 3 square meters per gram.

47. A composite article as in claim 45, wherein the microfibers have a surface area of at least 5 square meters per gram.

* * * * *

UNITED STATES PATENT AND TRADEMARK OFFICE
CERTIFICATE OF CORRECTION

| | | |
|---|---|---|
| PATENT NO. | : 6,630,231 B2 | Page 1 of 1 |
| APPLICATION NO. | : 09/809446 | |
| DATED | : October 7, 2003 | |
| INVENTOR(S) | : Mario A. Perez | |

It is certified that error appears in the above-identified patent and that said Letters Patent is hereby corrected as shown below:

<u>Column 34</u>
Line 37 in claim 12 delete "arc" and insert --are--, therefore.
Line 55 in claim 19 delete "legs" and insert --less--, therefore.

<u>Column 36</u>
Line 41 in claim 46 delete "microfiber" and insert --microfibers--, therefore.

Signed and Sealed this

First Day of May, 2007

JON W. DUDAS
*Director of the United States Patent and Trademark Office*